United States Patent [19]
Nakane et al.

[11] Patent Number: 5,933,410
[45] Date of Patent: Aug. 3, 1999

[54] OPTICAL DISC AND OPTICAL DISC DRIVING APPARATUS

[75] Inventors: Kazuhiko Nakane; Hiroyuki Ohata; Masato Nagasawa; Kenji Gotoh; Yoshinobu Ishida, all of Tokyo; Isao Satoh, Neyagawa; Shunji Ohara, Higashiosaka; Takashi Ishida, Yawata; Yoshinari Takemura, Settsu, all of Japan

[73] Assignees: Mitsubishi Denki Kabushiki Kaisha, Tokyo; Matsushita Electric Industrial Co. Ltd., Osaka, both of Japan

[21] Appl. No.: 08/883,443

[22] Filed: Jun. 26, 1997

[30] Foreign Application Priority Data

Jun. 26, 1996 [JP] Japan ..................................... 8-166218

[51] Int. Cl.⁶ ....................................................... G11B 7/26
[52] U.S. Cl. ..................................... 369/275.3; 369/275.4
[58] Field of Search ............................. 369/275.3, 275.4, 369/275.1, 275.5, 124, 278, 44.26, 13, 109–111, 277; 428/64.1, 64.2

[56] References Cited

U.S. PATENT DOCUMENTS

| | | | |
|---|---|---|---|
| 4,707,816 | 11/1987 | Yonezawa et al. | 369/44.13 |
| 4,748,609 | 5/1988 | Yonezawa et al. | 369/44.13 |
| 5,383,176 | 1/1995 | Inui et al. | 369/275.4 |
| 5,452,284 | 9/1995 | Miyagawa et al. | 369/124 |
| 5,616,390 | 4/1997 | Miyagawa et al. | 428/64.1 |
| 5,805,565 | 2/1996 | Miyamoto et al. | 369/275.4 |

FOREIGN PATENT DOCUMENTS

| | | |
|---|---|---|
| 588305 | 3/1994 | European Pat. Off. . |
| 757343 | 2/1997 | European Pat. Off. . |
| 57-050330 | 3/1982 | Japan . |
| 265022 | 10/1990 | Japan . |
| 038633 | 2/1992 | Japan . |
| 6-176404 | 6/1994 | Japan . |
| 6-274896 | 9/1994 | Japan . |
| 6-290465 | 10/1994 | Japan . |
| 029186 | 1/1995 | Japan . |
| 7-057302 | 3/1995 | Japan . |
| 7-110944 | 4/1995 | Japan . |
| 7-46430 | 5/1995 | Japan . |
| 7-141701 | 6/1995 | Japan . |
| 8-022621 | 1/1996 | Japan . |

OTHER PUBLICATIONS

The Japan Society of Applied Physics, "Japanese Journal of Applied Physics", Part 1, Nov. 1993, vol. 32 No. 11B.
Masatoshi Ohtake, et al., "Composite Wobbled Tracking in the Optical Disk System", Dec. 12–13, 1985.

*Primary Examiner*—Ali Neyzari

[57] ABSTRACT

An optical disc using a single-spiral land and groove track format enabling accurate tracking offset correction and reliable detection of the transition point between a land track and a groove track, and a driving apparatus therefor. Four physical address areas PID1, PID2, PID3, and PID4 are recorded to a header area such that PID1 and PID2 are offset one-half track pitch toward the outside circumference of the disc from the groove track center, and PID3 and PID4 are offset one-half track pitch toward the inside circumference of the disc from the groove track center, and the physical address areas PID1–PID4 can be detected by means of a difference signal in the radial direction. The single frequency pattern area VFO at the beginning of each PID is lengthened by PID1 and PID3, thereby enabling tracking offset correction using a sum signal, and detection of the land-groove transition point using a difference signal obtained from the PID offset.

5 Claims, 16 Drawing Sheets

Fig.2

| SECTOR (2697) | | | | | | | | |
|---|---|---|---|---|---|---|---|---|
| PREPIT AREA | | DATA RECORDING AREA (2567) | | | | | | |
| HEADER AREA | MIRROR AREA | GAP | GUARD DATA | VFO3 | PRE SYNC | DATA AREA | PA | GUARD DATA | BUFFER |
| 128 | 2 | 10 | 15 | 35 | 3 | 2418 | 1 | 45 | 40 |

Fig.3

| HEADER AREA | | | | | | | | | | | | | | | | | | | | |
|---|---|---|---|---|---|---|---|---|---|---|---|---|---|---|---|---|---|---|---|---|
| PID1 | | | | | PID2 | | | | | | PID3 | | | | | | PID4 | | | |
| VF01 | AM | Pid1 | IED1 | PA | VF02 | AM | Pid2 | IED2 | PA | VF01 | AM | Pid3 | IED3 | PA | VF02 | AM | Pid4 | IED4 | PA |
| 36 | 3 | 4 | 2 | 1 | 8 | 3 | 4 | 2 | 1 | 36 | 3 | 4 | 2 | 1 | 8 | 3 | 4 | 2 | 1 |

OPTICAL DISC AND OPTICAL DISC DRIVING APPARATUS

BACKGROUND OF THE INVENTION

1. Field of the Invention

The present invention relates to a rewritable optical disc formatted for recording signals both to a recessed recording track formed by means of a guide groove and to an unrecessed recording track formed between said guide groove, and to a driving apparatus therefor.

2. Description of Related Technology

A land and groove recording method whereby data is recorded both to the recessed part (the "groove") of a normally spiralling guide channel and to the unrecessed media area between the groove spirals (the "land") of the guide channel has been proposed as the recording method of a high capacity rewritable optical disc as a means of improving the recording density. This method obviously has the effect of greatly improving the recording density because the track pitch of the recording tracks can thus be halved on a disc of a given groove pitch.

A conventional optical disc formatted for land-groove recording is described in Japan Unexamined Patent Publication (kokai) S63-57859 (1988-57859) and shown in FIG. 13 by way of example only. As shown in FIG. 13, both groove 94 and land 95 are formed by means of a guide channel cut into the surface of a disc substrate, and a recording layer 91 is then formed over the entire disc surface. Recording pits 92 are formed in the recording layer of both the groove 94 and land 95. The groove 94 and the land 95 each form a continuous recording track on the disc. Data recording and reproducing are accomplished with this optical disc by scanning the groove recording track or the land recording track with the focused laser beam spot 93 of the optical disc drive device. It should be noted that with this conventional land-groove recording track format the guide channel is formed as a single continuous spiral channel on the disc. The groove 94 and land 95 recording tracks are thus connected with each forming a single continuous spiral recording track, respectively.

Note that this disc format is referred to as a "double spiral land-groove format" or DS-L/G format in order to distinguish this disc format from the "single spiral land-groove format" or SS-L/G format described next below.

The single spiral land-groove format is shown in FIG. 14. In this format a single spiral is separated into plural groove recording tracks each equivalent to one circumference of the disc and plural land recording tracks each equivalent to one circumference of the disc where the land tracks are disposed between the groove tracks and the groove tracks and land tracks alternate from the beginning to the end of a single spiral formed on the disc. An optical disc formatted with a single spiral recording track with alternating contiguous groove recording tracks and land recording tracks as shown in FIG. 14 is described, for example, in Japan Unexamined Patent Publication (kokai) H4-38633 (1992-38633) and Japan Unexamined Patent Publication (kokai) H6-274896 (1994-274896).

A particular advantage of this single spiral land-groove format is that it is well-suited to continuous data recording and reproduction because the recording track is a single contiguous track on disc. This is particularly important, for example, in video applications because continuous data recording and reproduction is essential to moving picture reproduction. With a conventional double spiral land-groove format as shown in FIG. 13, however, the land track and groove track are formed as discrete recording spirals as described above. To shift and continue recording or reproduction from the land track to the groove track, for example, it is therefore necessary to interrupt recording or reproduction at at least one place on the disc surface in order to access the groove track from the land track. The same is true when continuing recording or reproduction from a groove track to a land track. While it is possible to avoid this interruption in recording or reproduction by, for example, providing a buffer memory, this results in increased cost. Note that this increased cost is avoided with the single spiral land-groove format described above.

As described in Japan Unexamined Patent Publication (kokai) H6-290465 (1994-290465) and Japan Unexamined Patent Publication (kokai) H7-57302 (1995-57302), the transition point between alternating groove tracks and land tracks is detected in a SS-L/G format disc, and tracking servo polarity is changed at the detected transition point to track either the groove recording track or the land recording track.

The method of forming the pre-embossed pits of the address signal proposed for an optical disc using the conventional land-groove recording track format is described next below. There are three known methods of forming the pre-embossed address signal pits in the conventional double spiral land-groove format as shown in FIG. 15.

With the independent land/groove addressing method shown in FIG. 15A, a unique sector address is assigned to the land track sectors and groove track sectors. If the width of the address signal pits is equal to the groove width, the pits will be connected to the pits forming the sector address signal of the adjacent track, and address signal detection will not be possible. The address signal pit width must therefore be less than the groove width, and is usually approximately half the groove width.

However, if grooves and pits of different widths are to be continuously formed during production of the optical disc master, it is necessary to change the diameter of the laser beam when cutting the pre-embossed pits and when cutting the grooves. It is therefore necessary to cut the master disc using two laser beams, one for cutting the grooves and one for cutting the pits. This requires high precision alignment of the beam spot centers because an offset between the two beam spot centers causes an offset between beam tracking when reproducing the address signal pits and when recording and reproducing user data. This degrades the quality of the reproduced data. More specifically, a tracking offset increases the error rate, which leads to lower data signal reliability. It is therefore necessary to precisely align the two laser beams, which leads to increased cost during master disc production.

Considering these problems, a method of cutting both grooves and pits using a single laser beam so that the address signal pit width is substantially equal to the groove width as shown in FIG. 15B and FIG. 15C is preferable in terms of the precision and cost of disc production.

The format shown in FIG. 15B is that of a conventional optical disc as described in Japan Unexamined Patent Publication (kokai) H6-176404 (1994-176404). This format uses a common land/groove addressing scheme. The pre-embossed pits of the address signal are formed at approximately the center of a land track and groove track pair such that both tracks can be addressed using the same single address signal pits.

The format shown in FIG. 15C is that of a conventional optical disc as described in Japan Unexamined Patent Publication (kokai) H7-110944 (1995-110944). This format uses an independent land and groove addressing scheme in which an independent address is assigned to each land track and each groove track using pre-embossed pits formed offset in a line parallel to the track such that the address signal pits for adjacent tracks will not overlap.

In addition to the track format and sector format considerations of the land and groove recording methods described above, it is also necessary to consider servo characteristics.

A single beam optical system is used with recordable optical discs as a means of improving the light utilization efficiency. In the push-pull method, which is one example of such systems, a sensor offset occurs as the lens shifts in the radial direction. A tracking offset can lead to crosstalk and cross-erase problems, and is therefore a significant problem in high density recording. It is therefore necessary to apply offset correction to eliminate any tracking offset. Various offset correction methods have been studied.

Using the conventional methods of inserting address signals for land and groove recording, it has not been possible to achieve the characteristics required to achieve the tracking offset correction needed with single spiral land-groove format optical discs. With the common land/groove addressing method shown in FIG. 15B, for example, the pits are formed on only one side and the tracking offset tends to simply increase during address signal reproduction. Furthermore, not only does this also happen with the discrete land and groove addressing method shown in FIG. 15C, but tracking offset detection is also difficult.

A typical conventional method of compensating for the tracking offset that occurs in a push-pull tracking servo method is described in Japan Examined Patent Publication (kokoku) H7-46430 (1995-46430) and known as the so-called "composite track wobbling" method. This method is described as continuously applying push-pull tracking servo control to "an optical disc wherein a header area comprising a pit sequence offset laterally from a track center disposed to a particular place, and a data recording area comprising a preformed groove of a particular depth, are formed alternately along a predetermined track." Using the symmetry of the signal amplitude when the wobbling pit sequence is reproduced in the header area, the tracking servo is controlled so that the signal amplitude reproduced from the pit sequence wobbling laterally to the track center is the same on both sides of the track center to compensate for low frequency tracking offset.

This technique is more effective than those shown in FIG. 15 with respect to inserting the header address signal.

Technologies related to the sector format of rewritable optical discs are described below.

One example of the sector format of a rewritable optical disc is that of an ISO-standard 130 mm magneto-optical disc with a double-sided recording capacity of approximately two gigabytes (2 GB). This sector format is standardized in ISO-13842, "Information Technology—Extended Capacity Rewritable and Read-Only 130 mm Optical Disk Cartridges." The sector format of a sector with a 512-byte user data area is shown by way of example in FIG. 16.

In this example each sector comprises a header area containing address information and a data recording area. The header area is formed on the land from preformatted embossed pits that are narrower than the land, and the data recording area is formed on the land. Each recording sector is 799 bytes long, including a 512-byte user data area.

The header area comprises in sequence from the beginning thereof a sector mark SM that is used for detecting the beginning of the sector and consists of a mirror surface and embossed pit of a length that does not occur in the data modulation signal, a single frequency pattern area VFO1 for reproduction clock synchronization, address mark area AM for byte synchronization during header reproduction, and address area Pid1 for storing the sector address information. This sequence of single frequency pattern area VFO2 for reproduction clock synchronization, address mark area AM for byte synchronization during header reproduction, and address area Pid2 for storing the sector address information is then repeated, and the preformatted header then concludes with a postamble area PA for completing modulation.

The lengths of these areas in the header are sector mark SM, 8 bytes; VFO1, 26 bytes; address mark AM, 1 byte; Pid1, 5 bytes; VFO2, 20 bytes; address mark AM, 1 byte; Pid2, 5 bytes; and postamble PA, 1 byte. Note that the first VFO1 of the two single frequency pattern areas VFO in the header area is longer than the second VFO2.

The physical address area Pid comprises 3 bytes containing the sector address information and Pid number, and a 2-byte address error detection code. The sector address is calculated based on the track address written to bytes 1 and 2, and the sector address written to the low six bits of byte 3.

The data recording area comprises in sequence from the beginning thereof a laser power adjustment area ALPC with an adjustment margin Gap therebefore and after, a single frequency pattern area VFO3 for synchronizing the reproduction clock of the recorded data, a synchronization mark Sync for byte synchronization during reproduction, a data area Data, and a buffer zone Buffer for absorbing variations in disc rotation and clock frequency. Note that the data area Data contains the user data written to the sector, a CRC for error detection and correction, and a resynchronization byte Resync for recovering from synchronization loss.

The lengths of these areas in the data recording area are 10 bytes for the ALPC and Gap areas; 27 bytes for VFO3; 4 bytes for Sync; 670 bytes in the Data area; and a 21-byte Buffer. Note that VFO3 is longer than VFO1 in the header.

Note, further, that (1,7) modulation code is used in this standard where the coding parameters of the modulated signal expressed in the format (d,k;m,n) are (1,7;2,3). In (1,7) modulation code the shortest mark length Tmin is (d+1)T, which equals 2T, and the longest mark length Tmax is (k+1)T, which equals 8T. A 2Tpattern, which is the pattern with the shortest period in (1,7) modulation coding, is used for VFO1, VFO2, and VFO3. The modulated channel bits are recorded using the edges of the recording marks in a NRZI format so that data is expressed by the leading and trailing edges of each recording mark on the disc. It should be noted here that this is the recording method used in the invention described in this specification.

It should be further noted that a land and groove recording method has at present not been achieved using either a double spiral or single spiral recording track, and a physical format such as the sector format of a conventional magneto-optical disc has also not been achieved.

It is also necessary to consider compatibility with the format used in read-only optical discs in digital video applications when devising the sector format for a rewritable optical disc. For example, if a sector format providing the greatest possible compatibility with read-only digital video discs (DVD) comprising 26 synchronous frames of 93 bytes each in one sector, i.e., 2418 bytes/sector, is to be achieved, it is at least necessary for each sector in the rewritable optical disc to be formatted with the ability to store 2418 bytes of user data in the data area with the sector length, including the header area, being an integer multiple of 93 bytes.

One problem with conventional optical disc media using a land-groove recording track format when the optical system of the recording and reproduction apparatus uses a single beam for tracking is that an offset occurs in the tracking sensor accompanying a shift in the objective lens. This makes it difficult to detect the tracking offset using the recorded address signal.

While it is necessary to detect with high reliability the transition point between the land track and groove track in an optical disc using the single spiral land-groove format, such high reliability detection is difficult using the conventional methods of recording the address signal to a land-groove recording track format optical disc.

As with read-only optical disc media, rewritable optical disc media are also used for video applications. In order for a reproduction device to be able to reproduce both types of optical disc media at the lowest possible cost, it is therefore necessary for the format of rewritable optical disc media to be compatible with the format of read-only optical disc media so that the greatest possible number of common reproduction circuit components can be used in the reproduction device.

It is therefore necessary when adding address information to the physical disc format to ensure the read reliability of the address information and the length of the data recording area required in a phase-change medium.

SUMMARY OF THE INVENTION

With consideration for the above problems, an object of the present invention is to provide an optical disc having a single spiral land-groove format whereby tracking offset can be accurately corrected based on an address signal at the beginning of the sector, and the transition point between a land track and a groove track can be accurately detected, and to provide a driving apparatus for said optical disc.

A further object of the invention is to provide an optical disc having a physical format whereby format compatibility with read-only optical disc media can be easily achieved.

Yet a further object of the invention is to provide an optical disc having a physical format for improving the reliability of data rewrite operations and improving the reliability of address information reading.

To achieve the above objects, an optical disc according to the present invention is an optical disc wherein the data recording area comprises both grooves formed circumferentially to a disc substrate and the lands between said grooves, a phase-change recording film is formed in the data recording area for recording information using the leading and trailing edges of recording marks produced by a localized change in reflectivity effected in the phase-change recording film by emitting thereto a laser beam of a particular wavelength $\lambda$ focused by a lens of a particular aperture NA, and a single recording spiral is formed by alternately connecting groove recording tracks equivalent to one disc circumference and land recording tracks equivalent to one disc circumference with a track pitch p where p<($\lambda$/NA)<2p. The recording tracks comprise an integer number of recording sectors where the length of a recording sector is sufficient to store the data written to a recording sector of a read-only optical disc and is an integer multiple of the synchronous frame length of a read-only optical disc, and each recording sector comprises a mirror area that is simply a mirror surface area, and a header area preformatted with embossed pits that are detectable from a radial difference signal and represent such information as address information where at least the address information recorded to the header area is modulated by a runlength-limited modulation method.

The header area comprises a physical address area PID recorded four times. Each PID contains a single frequency pattern area VFO for synchronization clock generation and timing detection during reproduction, an address mark AM for byte synchronization during header reproduction and starting the detection timing, an address area Pid for holding the sector address information, an address error detection area IED for storing the address error detection code, and a postamble PA for completing modulation. When the four physical address areas PID are labelled PID1, PID2, PID3 and PID4 from the first PID in the header area, PID1 and PID2 are offset approximately p/2 toward the outside circumference or inside circumference from the track center of a groove recording track, and PID3 and PID4 are offset approximately p/2 toward the inside circumference or outside circumference from the track center of a groove recording track.

The recording marks in each VFO are longer than the shortest recording mark of the modulation method. In addition, VFO length in PID1 and PID3 is long enough to contain the edges of enough recording marks to lock reproduction clock synchronization within the VFO, and VFO length in PID2 and PID4 is long enough to contain the edges of enough recording marks to reassert reproduction clock synchronization within the VFO. The VFO areas in PID1 and PID3 are sufficiently longer than the VFO areas in PID2 and PID4.

The address mark AM is longer than the longest recording mark of the modulation method and long enough to contain plural channel bit patterns of a recording mark length not appearing in the modulation bit sequence. The Pid is at least long enough to discriminate a number of recording sectors capable of storing user data exceeding the recording capacity of the above read-only optical disc medium. The IED is a length enabling address area Pid reproduction errors to be detected with an error detection rate less than or equal to a particular rate. The postamble PA is at least the length required by the modulation method and is a length enabling recording marks to be completed, and the mirror area is longer than the longest recording mark of the modulation method.

The optical disc according to the invention may further define the track pitch p to be 0.74 $\mu$m when the laser beam wavelength $\lambda$ is 650 nm and the lens aperture NA is 0.6, the modulation method to be a method for modulating at a rate of 8 data bits to 16 channel bits with the shortest recording mark being 3 channel bits and the longest recording mark being 11 channel bits, and defines the VFO as 36 bytes in PID1 and PID3 and 8 bytes in PID2 and PID4, the address mark AM as 3 bytes, the Pid as 4 bytes, the IED. as 2 bytes, the postamble PA as 1 byte, and the mirror area as 2 bytes.

An optical disc driving apparatus for driving an optical disc according to the invention comprises a disc motor for rotating the optical disc at a particular linear velocity, a laser diode for generating a laser beam of a particular wavelength $\lambda$, a focusing lens with a particular aperture NA, a photodetector for detecting reflected light from the optical disc, a first reproduction circuit for obtaining a sum signal of the total light incident on the photodetector, and a second reproduction circuit for obtaining a difference signal in the radial direction from the light incident on the photodetector.

The rotational velocity of the disc motor is controlled to drive the optical disc at a particular linear velocity, a laser beam of wavelength λ is focused by a lens of aperture NA on the data recording area through the disc substrate, and the emitted laser power is controlled to a particular reproduction power level during information reproduction. The focused laser beam is focused at a particular position on the phase-change recording film by means of focusing servo control perpendicular to the recording surface and tracking servo control radially to the recording track. Tracking offset is corrected based on the sum signal obtained from the first reproduction circuit, and the boundary between groove recording tracks and land recording tracks is detected based on the difference signal obtained from the second reproduction circuit, when the laser beam scans PID1, PID2, PID3, and PID4.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given below and the accompanying diagrams wherein:

FIG. 2 is a map of the sector layout in an optical disc according to the first embodiment of the invention;

FIG. 3 is a map of the header area layout in an optical disc according to the first embodiment of the invention;

DESCRIPTION OF PREFERRED EMBODIMENTS

Figure 1:
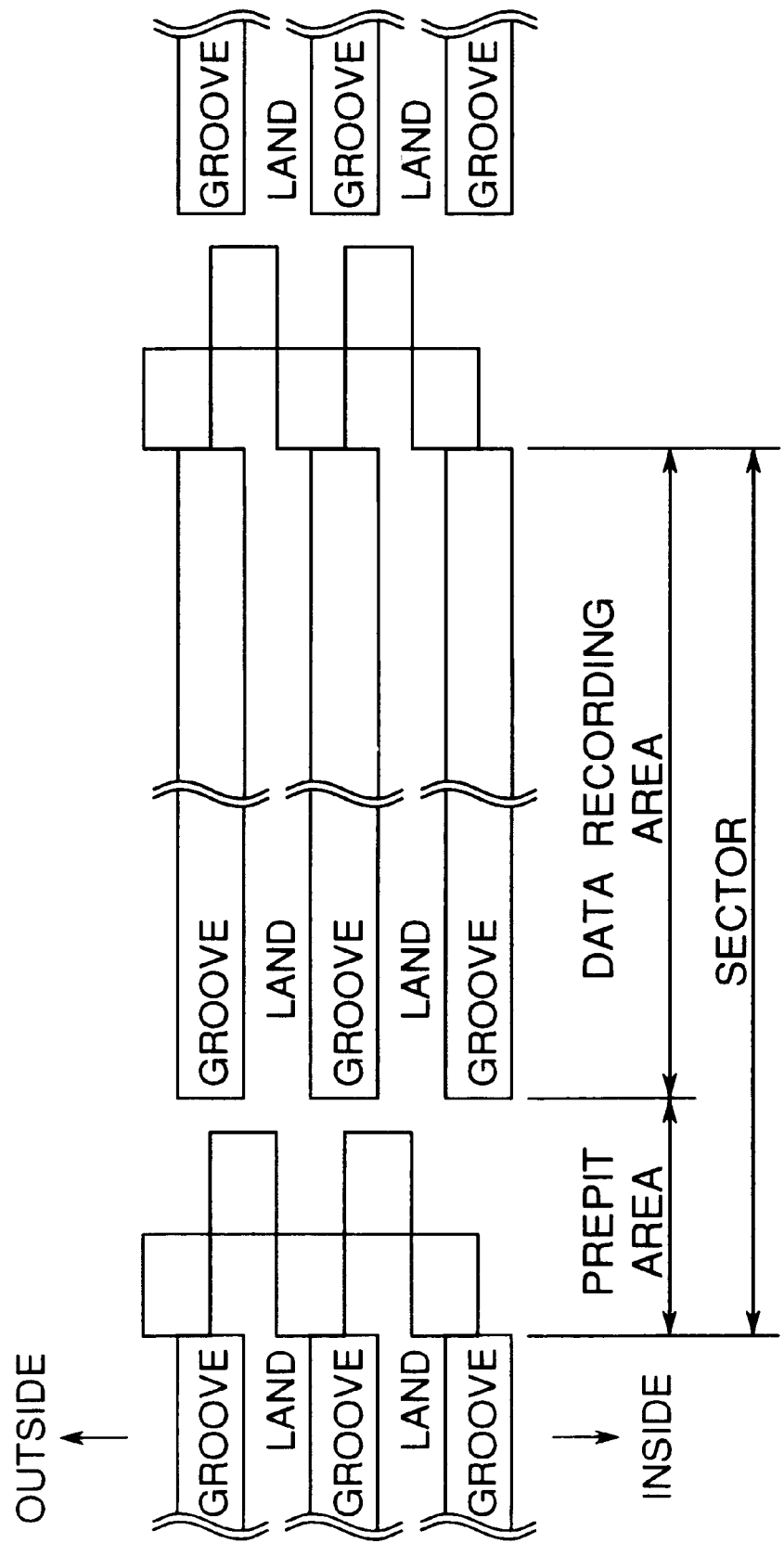
FIG. 1 is a sector format diagram of an optical disc according to the first embodiment of the invention.

The preferred embodiments of the present invention are described below with reference to the accompanying figures.

Embodiment 1

High capacity rewritable optical disc media according to the preferred embodiments of the present invention is comprised to satisfy the following conditions:

1. a specific overall recording capacity,
2. compatibility with read-only optical disc media,
3. a recording density whereby practical data reliability that can be assured.

Therefore, because there is a trade-off between total disc capacity and linear recording density, the zone divisions, sector structure, sector length, and byte size of each area in each sector are predetermined to balance this trade-off with the above conditions.

The constraints on sector size as they relate to compatibility with the sector format of read-only optical disc media are described below, noting first that the read-only optical disc media considered herein is a read-only Digital Versatile Disc (DVD) medium (DVD-ROM below). The data capacity of one recording sector on a DVD-ROM is 2048 bytes. Each sector also contains such control information as error correction code, synchronization signals, and a sector address signal in addition to data. The synchronous frame length in this sector format is 93 bytes, and each recording sector contains 26 contiguous synchronous frames of 93 bytes each. A synchronization mark is inserted at 93-byte intervals, i.e., the synchronous frame length, and the sector size is therefore 93×26=2418 bytes.

In a rewritable optical disc according to the present invention, the synchronous frame length used, for example, for disc speed control is equal to the synchronous frame length of a DVD-ROM. This enables the rewritable optical disc to be easily reproduced using a DVD-ROM driving apparatus, and is an extremely important condition for assuring compatibility with DVD-ROM media during reproduction.

Because the synchronous frame length of a DVD-ROM is 93 bytes, the record sector length of an optical disc according to the present invention is (93×n) bytes. User data and error correction code in a DVD-ROM are recorded in 2418-byte batches to the record sector. Furthermore, for the address management needed for the rewritable area, the record sector also comprises an additional header area to which is written the address information. This means that the integer n whereby the sector length including this new header area is determined is a value of 27 or greater because (93×n) must be greater than 2418. However, if n is unnecessarily great, the redundancy to data capacity ratio increases.

The data recording density is determined by track pitch and linear recording density, as well as the redundancy of the sector format. The track pitch is 0.74 µm and the linear recording density is limited to a bit length of 0.4 µm or greater. While described in greater detail below, note that the track pitch is determined by limitations relating to tracking servo signal detection stability and crosstalk performance requirements, specifically the ability to suppress crosstalk from an adjacent track so that the data error rate remains below a particular level. The linear recording density is likewise determined based on the ability to suppress jitter in the signal reproduced from the recorded signal so that the reproduction error rate is suppressed below a particular level. Because of these limitations, the optimum value of n is 29 if a total per-disc recording capacity of 2.6 GB per side is to be achieved on a 120 mm diameter disc. The recording sector length is thus 2697 bytes.

If the recording sector length is 2697 bytes there is no extra capacity for byte allocation to the various areas disposed in the sector. The conditions that must be satisfied in each of the sector subareas and the allocation satisfying these conditions and the overall constraints of the disc are described below. If extra byte capacity is available, it is easy to assign sufficient length to the header area, which is redundant, and thereby assure high reliability in address information reproduction. For the reasons described above, however, it is extremely difficult to manipulate the address signal placement to eliminate redundancy while also assuring reliability in an optical disc according to the preferred embodiment of the invention.

The sector layout of an optical disc according to the present invention is described next below with reference to the accompanying figures. It should be noted here that a sector is the unit of data that can be read at one time by the disc driving apparatus.

It should be further noted that the data recording area of an optical disc according to the present invention comprises both grooves formed circumferentially to the disc substrate and the lands between said grooves. This data recording area is coated with a phase-change recording film in which a localized change in reflectivity is effected for writing and erasing data by emitting thereto a laser beam of a particular wavelength λ focused by a lens of a particular aperture NA. Data is recorded by means of the leading and trailing edges of the recording marks produced by this local change in reflectivity.

An aligned sector format is also used. In this format the header area of each sector is aligned with the header areas of the adjacent tracks at the same radial position. The optical disc of the invention also uses a single spiral land-groove format (SS-L/G format) as described above, i.e., a format in which a single. spiral is separated into plural groove recording tracks each equivalent to one circumference of the disc and plural land recording tracks each equivalent to one circumference of the disc where the land tracks are disposed between the groove tracks, the groove tracks and land tracks alternate from the beginning to the end of a single spiral formed on the disc, and each recording track comprises an integer number of recording sectors.

The entire disc surface is also divided into plural zones with a zone format in which the number of recording sectors per track increases from the inside circumference side to the outside circumference side of each zone, and the linear recording density of sectors in each zone is substantially equal.

The sector format of an optical disc medium according to a preferred embodiment of the invention is shown in FIG. 1 and described below. As shown in FIG. 1, each sector comprises a preformatted pit area formatted with embossed pits so that address information, for example, can be detected from a difference signal in the radial direction, and a data recording area for recording other information. The first part of the header area, i.e., the part corresponding to PID1 and PID2 above, is offset approximately p/2 (where p is the track pitch) toward the outside circumference of the disc from the track center, and the latter part of the header area, i.e., the part corresponding to PID3 and PID4 above, is offset approximately p/2 toward the inside circumference of the disc from the track center such that a wobble signal is generated as the laser beam scans the header area.

The sector layout of an optical disc medium according to the first embodiment of the invention is shown in FIG. 2. As shown in FIG. 2 each 2697-byte sector comprises a 130-byte preformatted pit area comprising a 128-byte header area and a 2-byte mirror area comprising simply a mirror surface, and a 2567-byte data recording area for storing 2048 bytes of user data. The data recording area more specifically comprises a 10-byte gap area, 15-byte guard data area, 35-byte single frequency pattern area VFO3, 3-byte presync area, 2418-byte data area, a 1-byte postamble, 45-byte guard data area, and a 40-byte buffer zone. Sector length variations resulting from write clock or disc speed errors are compensated for using the buffer zone at the end of each sector.

To increase the user data capacity of the optical disc it is necessary to shorten the redundancy header area as much as possible while still ensuring the reliability of address reproduction. Furthermore, to maintain format compatibility with read-only optical discs, (93×3=) 279 bytes of the total 2697-byte sector length must be allocated to the areas required to enable data rewriting, including the header area, gap, guard data, VFO3, and buffer.

The modulation method used for recording data to an optical disc is the so-called (8,16) modulation method in which the (d,k;m,n) coding parameters are (2,10;8,16). This is a runlength-limited (RLL) coding method in which the shortest mark length Tmin is 3T and the longest mark length Tmax is 11T.

The layout of the header area of an optical disc according to the preferred embodiment of the invention is shown in FIG. 3. Note that the header area comprises PID1, PID2, PID3, and PID4 where PID1 comprises a VFO (Variable Frequency Oscillator) 1, address mark AM, Physical ID (Pid) 1, ID Error Detection code (IED) 1, and postamble PA. PID2 similarly comprises VFO2, AM, Pid2, IED2, and PA. PID3 repeats VFO1 and comprises AM, Pid3, IED3, and PA. PID4 likewise repeats VFO2 and comprises AM, Pid4, IED4, and PA.

PID1 and PID2 are disposed on the border between a groove track and the land track on the outside circumference side of that groove track, and PID3 and PID4 are disposed on the border between a groove track and the land track on the inside circumference side of that groove track. More specifically, PID1 and PID2 are disposed offset approximately p/2 (where p is the track pitch) toward the outside circumference of the disc from the track center of the groove recording sector, and PID3 and PID4 are offset approximately p/2 toward the inside circumference of the disc from the track center of the groove recording sector.

It should be noted that the numbers below each of the area codes shown in FIG. 2 and FIG. 3 indicate the byte size of the corresponding area.

The single frequency pattern area VFO for synchronization clock generation and timing detection during reproduction is described next below. Note that the header area contains two VFO1 and two VFO2 blocks, while a third VFO3 block is used in the data recording area. These VFO blocks are used for extracting the phase-locked loop (PLL) used to generate the read channel bit clock, which is used for signal reproduction. While VFO1 and VFO2 are formed from pre-embossed pits, VFO3 is written during data recording.

As shown in FIG. 3 VFO1 is 36 bytes and VFO2 is 8 bytes. The PID1 and PID2 pair and the PID3 and PID4 pair are offset from the track center in the radial direction as described above. Why VFO1 in PID1 and PID3 is longer than VFO2 in PID2 and PID4 is described below.

Figure 4:
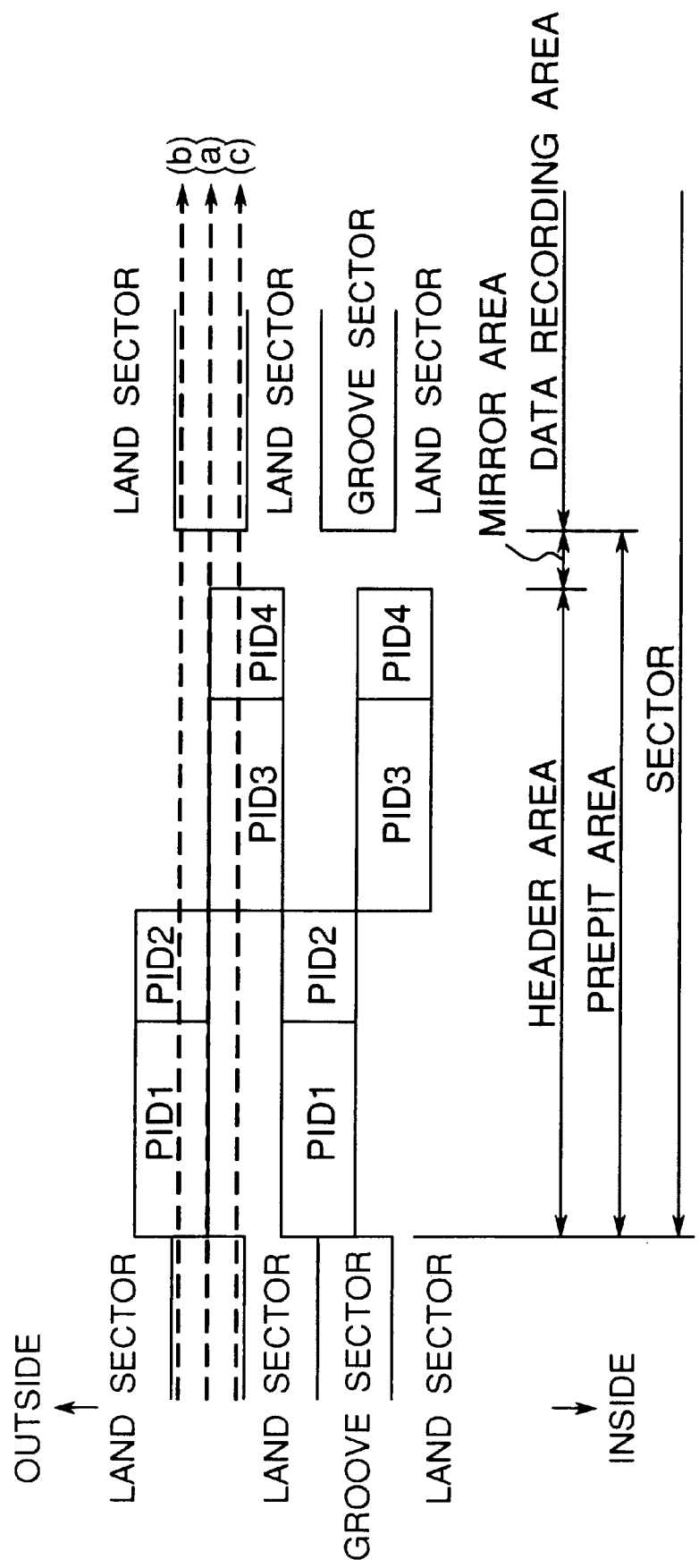
FIG. 4 is used to describe light spot scanning of the header area of an optical disc according to the first embodiment of the invention.

Note that the path of the light spot when scanning groove tracks follows a path through the header area of the track as shown in FIG. 4 where path (a) is the path scanned when the spot is aligned to the track center and VFO1 is read correctly in each of PID1–PID4. However, when the light spot follows path (b) offset to the outside circumference side of the track center, the light spot is offset from PID3 and PID4 and the signal component therefrom is weak. In a worst case scenario data cannot be read from PID3 and PID4. In this case, therefore, the PLL is obtained from VFO1 at the beginning of PID1. When the light spot follows path (c) offset to the inside circumference side of the track center, the light spot is offset from PID1 and PID2 and the signal component therefrom is weak. In a worst case scenario data cannot be read from PID1 and PID2. In this case, therefore, the PLL is obtained from VFO1 at the beginning of PID3. It is thus obvious that VFO1 in PID1 and PID3 is the point at which the PLL is locked, and must therefore be longer than the VFO2 in PID2 and PID4 in order to improve signal reproduction reliability.

Consideration is also made for error in PID placement in the groove tracks and land tracks. Bit synchronization is normal in the groove track PID reading because all four PID read from the groove tracks are cut in a single continuous operation. The PID pits read from a land track, however, are cut when cutting the adjacent groove tracks on both sides of the land track and thus encroach into the land track. Because two tracks are thus effectively formed with a single cutting operation, rotational deviations in turntable operation appear in the PID, and it is therefore normal to expect that bit synchronization will not be achieved. It is therefore necessary when reading the land track PID to restore bit synchronization and byte synchronization using the VFO and address mark AM at the beginning of PID3 and PID4.

The length of the VFO is the minimum length required to ensure error-free reproduction of the header area, which wobbles on both sides of the track center as described above, when tracking a groove track and when tracking a land track even if tracking does deviate some from the track center.

The VFO used in an optical disc medium according to the present invention is a pattern such as . . . 1000100010001 . . . . Note that this VFO pattern is different from the VFO pattern used in, for example, a standard ISO-13842 optical disc (an international standard for 130 mm optical discs, which uses a (1,7) modulation method), i.e., the highest recordable frequency pattern, . . . 101010 . . . of the (1,7) modulation method. If this practice of using the highest recordable frequency pattern were followed, the VFO pattern in an optical disc according to the present invention would be . . . 1001001001 . . . because of the (8,16) modulation method used.

There are drawbacks to using a high frequency pattern, however, including a low reproduction signal amplitude, greater difficulty locating the sector start, and increased jitter. A conventional ISO-standard optical disc places a sector mark SM before the VFO to facilitate finding the beginning of the sector, which then makes it simple to establish a PLL even with a maximum frequency VFO pattern. Each sector starts with the VFO in an optical disc medium according to the present invention, however, and it is therefore more difficult to locate the sector start.

On the other hand, if the frequency of the VFO is too low, i.e., if the interval between "1" bits is too great, it becomes difficult to generate the channel bit clock from the PLL within an area of a limited byte length. To minimize both of these problems, a pattern such as . . . 1000100010001 . . . is used in the present invention as described above. Note that the same pattern is used in VFO1, VFO2, and VFO3.

If the byte length of VFO1 is k bytes, and an (8,16) modulation method in which 8 bits of data are converted to 16 channel bits is used, then the length of VFO1 is k×8× 2=16k channel bits where the channel bits are the bits after signal modulation. Because a . . . 100010001 . . . VFO pattern is used, changes between spaces and marks occur at 16k/4=4k places. In an ISO-13842 disc, however, the VFO size is 26 bytes, and there are therefore 26×8×3/2/2=156 changes between spaces and marks. Therefore, because the number of space-mark changes, 4k, in the VFO of the invention must approximately equal the number of changes in the VFO of an ISO-13842 standard disc, 4k=156 or k equals approximately 39 bytes. VFO length is therefore defined as the shortest length required, or 36 bytes, with consideration also given to the PLL and slice level settling time.

An address mark AM for byte synchronization during header area reproduction and starting synchronization clock detection is located in each PID between the VFO and Pid. This is to lock byte synchronization after bit synchronization is completed in the preceding VFO. To prevent the reproduction apparatus from mistakenly capturing the address mark AM as data from the user data area, the address mark AM is longer than the longest recording mark possible with the modulation method and is written using a pattern that does not appear according to the modulation rules, i.e., the address mark AM is a channel bit pattern of a recording mark length that does not appear in the modulated bit stream. The 3-byte (48-bit) pattern 000100010000000000000100010001000000000000001 0001 containing two 14T sequences, which are longer than the longest mark length Tmax=11T bit sequence of the modulation method is used in present embodiment as a pattern that is not used anywhere else.

Note that the above 3-byte pattern is used to ensure the uniqueness of the pattern and enable the synchronization points to be reliably captured even with a slight amount of signal error. It is also possible to easily and reliably recognize the address mark AM when reading the header area because a channel bit pattern of a recording mark length that does not occur in the modulated bit stream is used for the address mark AM.

The Physical ID Pid area following the address mark AM stores the sector address, i.e., a unique physical address. The Pid is 4 bytes long. The first 1 byte contains information relating to that sector and Pid, and the remaining 3 bytes express an address number unique to that sector. The address information is preferably an integer byte length because of the ease of sector management and control firmware design.

More specifically, if a 2-byte Physical ID Pid is used, it is possible to manage $2^{16}$=65,536 sectors. Because the user data capacity of one sector is 2048 user data bytes, this makes it possible to manage 2048×65,536=134,217,728 bytes or approximately 134 megabytes. This, however, is not enough. By using a 3-byte Physical ID Pid, however, it is possible to manage $2^{24}$=16,777,216 sectors, which means that 2048×16,777,216=34,359,738,368 bytes or approximately 34.36 gigabytes of user data can be managed.

The recording capacity of an optical disc medium according to the present invention is approximately 2.6 GB, and the recording capacity of the digital video read-only optical disc (DVD-ROM) with which format compatibility is to be maintained is approximately 4.7 GB. Note that the approximately 34-GB recording capacity that can be managed with a 3-byte Pid is respectively approximately 13 and 7 times these capacity figures. By being able to manage such massive recording capacity, it will be possible to assure future compatibility without changing the sector format even when standards are changed in the future to further increase disc capacity.

As described above the ID Error Detection code (IED) area is the area to which a code for detecting error in the Physical ID Pid is recorded. The IED area is 2 bytes long. If an error in the Pid is detected using this code, that Pid is not used for address detection. There are, however, four Pid written to the header area at the beginning of each sector. This means that even if three of the Pid are corrupted, it is still possible to detect the address using the remaining fourth Pid.

By adding a 2-byte (16 bit) IED for each 4-byte Pid, the probability of missing an error in the Pid is $1/2^{16}$ or 1/65,536. Considering that the Pid is written four times in each header area, Pid errors can be detected with sufficient reliability. Because the IED is also managed in byte units, the probability of missing an error in the Pid using a 1-byte IED is only $1/2^8$ or 1/256. This level does not offer sufficient reliability, which can lead to various problems. The IED length is therefore defined as 2 bytes.

Note that in the pre-embossed pit area the pits are referred to below as "marks" and the places between the marks are "spaces." When the PID areas are recorded the Pid and IED are modulated with (8,16) modulation, which necessitates a 1-byte postamble following the IED for completing modulation. The end of the IED can also be a mark or a space. This means that if the postamble is skipped and the VFO follows directly after the IED, the VFO pattern will not be uniformly determined because of the space or mark at the end of the IED. Plural postamble PA patterns are therefore reserved according to the modulation rules. A 1-byte postamble PA is sufficient to complete both modulation and the recording mark.

A 2-byte mirror area is disposed at the end of the header area. This mirror area is a simple mirror surface in which no grooves or marks are formed. The mirror area can be used to correct the servo sensor signal by comparing the light reflected in this mirror area with the light reflected in a groove area, and must be a minimum length of 2 bytes because of electrical circuitry response speed considerations.

The gap area marks the beginning of the data recording area following the header area, and is 10 bytes. This gap area provides a time buffer during which the optical disc driving apparatus calibrates the laser power for recording or reproducing, a process that must be accomplished between reading the header area and starting the VFO3 read/write operation. A gap length of approximately 10 bytes is needed to assure a buffer time of approximately 6 $\mu$sec.

Guard data is placed immediately before the VFO3 area of the data recording area and immediately after the postamble PA following the data field. The object of the guard data area is to prevent data corruption from media deterioration. More specifically, phase-change media tend to deteriorate from where overwrite recording begins and ends after repeated record/erase operations. The purpose of this guard data area is to absorb the effects of any media deterioration so that media deterioration does not result in loss of data stored to the sector.

The required length of the guard data area has been clearly determined from experimental evaluation of the repeated recording life of phase-change media. The required minimum length expressed in bytes is here defined as approximately 15 bytes before the data and approximately 45 bytes after the data. It should be noted here that the length of the guard data following the data area also reflects the start position shift described below.

Another characteristic of phase-change media is that when the same data is repeatedly recorded and erased from the same place, media deterioration progresses and the repeated recording life tends to shorten. To prevent this by not repeatedly writing the same data pattern to the same disc area, a technique known as "start position shifting" is used to randomly move the data area recording position each time a data area is recorded. A particular repeated recording life can thus be obtained by changing the length of the guard data area to obtain the necessary shift, increasing the area before the data and decreasing the area after the data. The total length of the before and after guard data areas remains constant.

The size of the data area is determined by the ability to record 2048 bytes of user data. Sixteen bytes of complementary data comprising a 4-byte data ID, 2-byte data ID error detection code (IED) 6-byte reserve (RSV) block, and a 4-byte error detection code (EDC) are added to each 2048-byte block of user data. This complementary data and the user data are then scrambled to generate a data unit A, which is thus 2064 bytes long.

Sixteen data units A are grouped into one (2064×16=) 33,024 byte data block, which is arranged in a 192 row by 172 column matrix. Sixteen rows and 10 columns of error correction code (ECC) are then added, resulting in a 208 row by 182 column ECC block containing (208×182=) 37,856 bytes.

This 37,856-byte ECC block is then sliced into 91-byte segments and a 2-byte synchronization mark is inserted to the beginning of every 91st byte, thus growing the ECC block to 38,688 bytes. This total is then sliced into sixteen 2418-byte data unit B segments of 13 rows×186 bytes.

As a result of this process, the sixteen 2048-byte user data blocks are converted to 2418-byte blocks containing ECC and other information. While not described above, data modulation is also accomplished during this process. If the data recording capacity of each sector is 2418 bytes, it is therefore possible to ensure a 2048 byte/sector user data recording capacity. The data area size is therefore 2418 bytes.

As in the header area, a 1-byte postamble PA follows the data area for completing modulation and recording mark formation.

Guard data as described above follows immediately after the postamble PA, and is followed by a buffer zone. It should be noted that a certain amount of fluctuation in the rotational speed of the spindle motor used in the device rotationally driving the optical disc cannot be avoided, and a certain amount of eccentricity resulting from mounting the optical disc to the spindle motor must also be considered as these can cause the time length of the sector to vary. A buffer zone is therefore inserted to provide the margin needed to absorb these changes in the time-based length of the sector. When the driving apparatus records to the optical disc, modulated data is recorded onto the optical disc at the channel clock frequency of the driving apparatus. In general, the tolerance for variations in spindle motor speed is within 1% of the target speed, and tolerance for variations in linear speed resulting from eccentric rotation of the optical disc is within 0.5% of the spindle motor speed when linear speed is converted to spindle motor speed. The buffer zone must therefore be approximately 1.5% of the sector length (2697 bytes), or approximately 40 bytes, and 40 bytes is therefore allocated to the buffer zone in this embodiment. Note that writing data to the buffer zone is prohibited during recording. Data is also not read from the buffer zone during reproduction.

A total physical sector size of (93×n) bytes where n is an integer is preferred because synchronization marks are inserted at 93-byte intervals. The minimum value of n must therefore be 27 or greater because (93×n) must be greater than 2418. However, because the ratio of redundancy to the data recording capacity rises if n is too great, n is defined as 29. The sector size is thus 93×29=2697 bytes.

Using this sector size makes it possible to achieve format compatibility with DVD-ROM discs in which the synchronous frame length is 93 bytes. This is because while one sector of a DVD-ROM disc comprises 26 synchronous frames of 93 bytes each, or a total 2418 bytes, the user data capacity of the data area in an optical disc according to the present invention is 2418 bytes, and the sector length including the header area is an integer multiple of 93 bytes. Because the synchronization marks are also inserted every 93 bytes, an apparatus capable of reproducing a DVD-ROM disc can easily detect the 93-byte synchronous frames in the sector format of the invention using common reproduction circuitry.

The parameters relating to land and groove tracking and preformatted PID signal reading, specifically, groove width, pit width, and beam spot diameter, are described next below.

It is well known that the focused spot diameter is approximately $\lambda/NA$ where $\lambda$ is the wavelength of the laser used for optical disc reproduction and recording and NA is the aperture of the objective lens focusing the laser on the disc, although the spot diameter is also related to the intensity distribution of the laser beam incident to the objective lens. Thus, for example, if $\lambda=650$ nm and NA=0.6, spot diameter $\lambda/NA=1.08$ µm.

If the track pitch in an optical disc medium according to the present invention is p, the distance between groove centers is 2p, and the groove width and land width are both approximately p. The track pitch p is set as small as possible to achieve the highest possible track density in order to improve the recording density. Tests have demonstrated that if the spot diameter $\lambda/NA$ is 1.08 µm where $\lambda$ and NA are defined as above, the track pitch p must be 0.7 µm or greater to avoid crosstalk from adjacent tracks. While the optimum groove depth is also affected by the overlap of the beam spot into the adjacent track, substantially all crosstalk can be avoided in data recorded to adjacent tracks in a phase-change media if the groove depth is approximately $\lambda/6$.

To determine the maximum track pitch, what happens when the track pitch increases relative to the spot diameter $\lambda/NA$ is considered below. In land and groove recording schemes the track pitch is substantially equal to the groove width and land width. If the land width and groove width become greater than the focused spot diameter, diffraction in the radial direction caused by the groove will be substantially undetected when the light beam scans the track center. This is equivalent to the disc surface in the area of the spot diameter being a mirror surface, and is unsuitable for push-pull and similar tracking detection methods, which are widely used for single beam tracking systems in rewritable optical disc driving apparatuses, because a tracking error signal cannot be generated.

For these reasons the relationship between the track pitch p and the approximate spot diameter $\lambda/NA$ should be $p<(\lambda/NA)<2p$. In the present invention, therefore, the track pitch p is set to $p=0.74$ µm for a spot diameter $\lambda/NA$ of 1.08 µm. In this case the groove width and pit width are also equal to the track pitch at substantially 0.74 µm, and the distance between groove centers is 1.48 µm, thus satisfying the condition that $p<(\lambda/NA)<2p$.

It is also necessary to determine the groove depth so that a push-pull method can be used for tracking control. If the groove depth is set to approximately $\lambda/6$, the tracking error signal required for tracking control can be detected.

The same linear recording density is also used in the header area and the data area. Tests have also shown that a data bit length of 0.4 µm is the shortest practical bit length yielding acceptable signal characteristics with (8,16) modulation, mark edge recording. The shortest possible recording mark length in this case is 0.6 µm.

The PID arrangement in the header area is described next with reference to FIG. 5 in which the arrangement of the PID areas in a recording sector of an optical disc medium according to the present invention is shown. In the header area immediately preceding a data recording area in a groove track, PID1 and PID2 are offset ½ groove width toward the outside circumference from the groove center. PID3 and PID4 are offset ½ groove width toward the inside circumference from the groove center in the same header area.

This means that PID1 and PID2 in the header area immediately before the data recording area of a land track are, PID1 and PID2 from the groove track header area on the inside circumference side of that land track, and PID3 and PID4 are PID3 and PID4 from the header area of the groove track on the outside circumference side of that land track. This is because these are the PID offset ½ groove width from the center of the respective adjacent groove tracks towards that land track.

Figure 6:
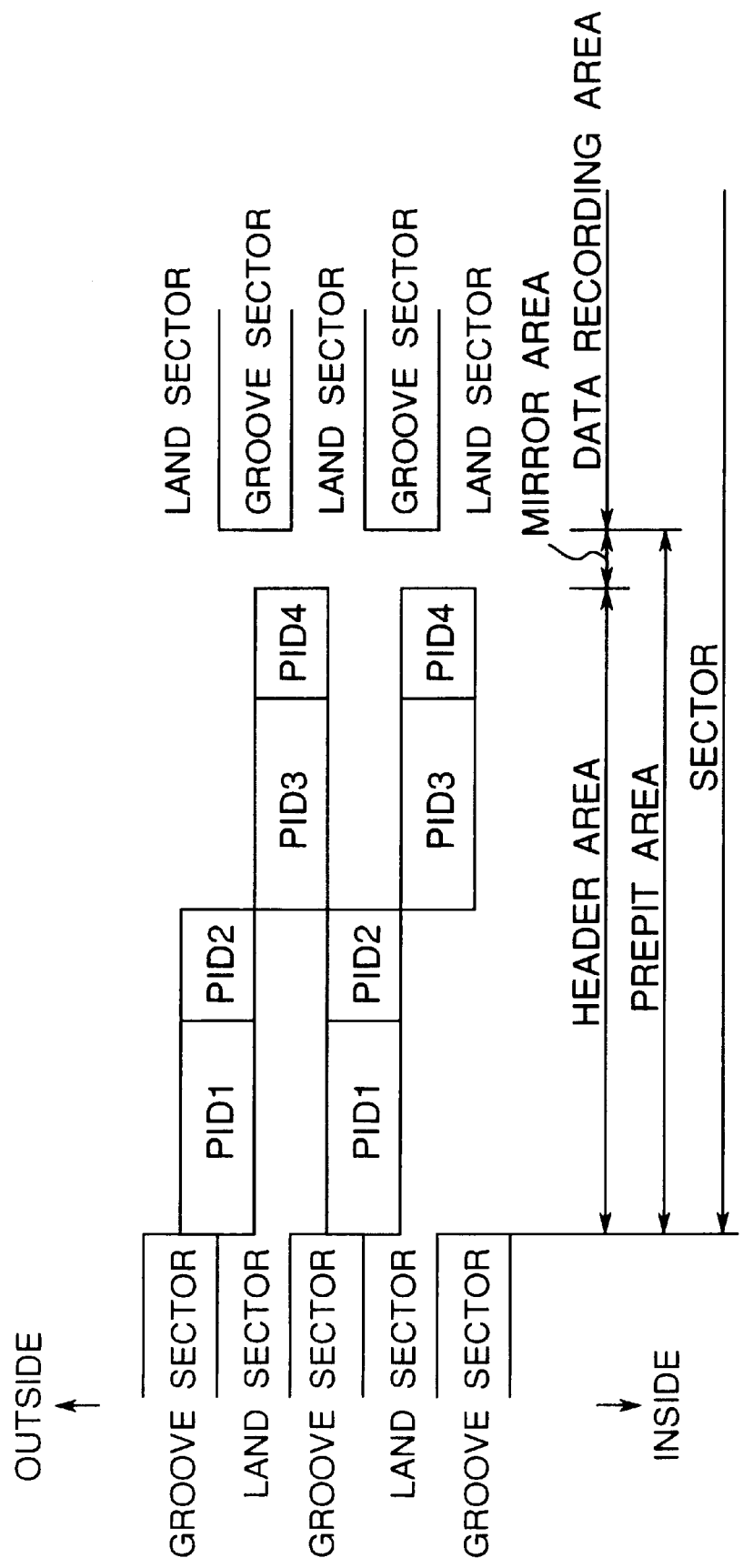
FIG. 6 is a map of the header area layout in the transition area between land tracks and groove tracks in an optical disc according to the first embodiment of the invention.

The transition points between the land and groove tracks are all aligned at a single position in the radial direction on the disc surface as described below with reference to FIG. 6. The arrangement of the PID in the sector header area at the transition between the lands and grooves in an optical disc medium according to the preferred embodiment of the invention is shown in FIG. 6. Note that in an SS-L/G format disc there is a single radial transition line where groove recording tracks and land recording tracks connect.

The format of the header area in this transition area is the same as the header format in non-transition areas. Specifically, PID1 and PID2 are offset ½ groove width toward the outside circumference from the groove center in the header area immediately preceding a data recording area in a groove track, and PID3 and PID4 are offset ½ groove width toward the inside circumference from the groove center in the same header area. This again means that PID1 and PID2 in the header area immediately before the data recording area of a land track are PID1 and PID2 from the groove track header area on the inside circumference side of that land track, and PID3 and PID4 are PID3 and PID4 from the header area of the groove track on the outside circumference side of that land track. This is because these are the PID offset ½ groove width from the center of the respective adjacent groove tracks towards that land track.

This arrangement is determined with consideration for the track offset that occurs during master disc cutting. Both groove header areas and land header areas are offset ½ groove width from the groove and land track centers. Cutting the address signals for adjacent lands and grooves simultaneously to cutting the groove recording tracks can reduce the track offset occurring between the groove center and the center line between PID1, PID2 and PID3, PID4 in the header area.

Figure 5:
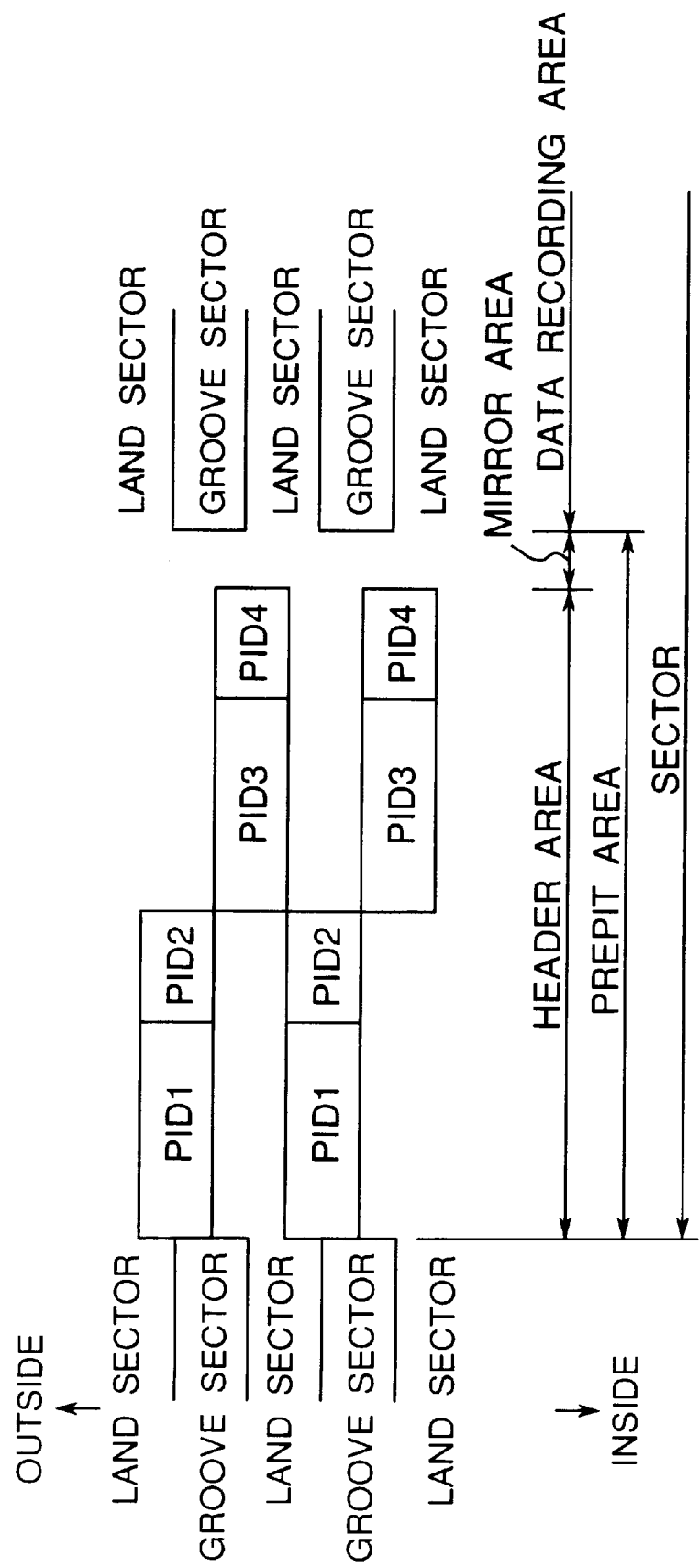
FIG. 5 is a map of the header area layout in an optical disc according to the first embodiment of the invention.

However, insofar as the PID arrangement shown in FIG. 5 and FIG. 6 can be achieved, the invention shall not be limited to the above master disc cutting method.

Tracking offset correction is also enabled by using the above header area format. With this format, tracking of fset can be detected using various wobble bit tracking offset correction methods by providing a pair of tracking offset detection bits, i.e., wobble bits, offset a known amount to both sides of the track center. When the light beam passes precisely between these wobble bits, the amplitudes of the reproduction signals generated according to the detected bit positions are equal. However, if the light beam is off track, the amplitude of the reproduction signal generated from the wobble bit on the side to which the beam is offset increases and the amplitude of the reproduction signal generated from the opposite wobble bit decreases. By comparing these signal amplitudes to detect how far off center the light beam is tracking, the beam path can be controlled to return to the track center. By splitting the header area into two parts and using a similar wobble PID arrangement in the sector format of an optical disc according to the present invention, the same principle can be applied in a single spiral land-groove format to similar effect.

For example, when the light beam moves from the data recording area of a particular groove recording sector into the header area of the next groove recording sector, the beginning of the address signal is offset ½ groove width to the outside circumference of the disc, and a corresponding reproduction signal is output. When the light beam then comes to the PID offset ½ groove width to the inside circumference side of the beam path, a corresponding reproduction signal is output. Because the header signal is generated in this manner, the increase and decrease in the reproduction signal amplitude due to tracking offset is reversed between the groove sector header area and the land sector header area. If both signal amplitudes are the same, the light beam is known to be scanning the track center. If both signal amplitudes are not the same, the difference of the reproduction signals from the header areas offset to the inside circumference and outside circumference sides of the disc can be used for tracking servo offset correction.

The format of the present invention allocates 64 bytes to PID1 and PID2, and 64 bytes to PID3 and PID4. Offset correction in the header area can therefore be achieved even if the tracking offset detection circuit does not have a very wide frequency characteristic.

When the header area is thus formatted it is theoretically possible to detect the address signal using two types of signals. One of these is sum signal detection, a method used when reproducing media formatted with a phase bit on the track center as in a Compact Disc (CD). In this method light reflection from the disc is decreased due to diffraction by the phase bit. The sum of the reflected light is therefore obtained for signal detection.

The other method is difference signal detection, which is based on the same principle applied for tracking error detection in the push-pull method. In this method a split photodetector is arrayed in the track direction of the disc for push-pull detection of difference signals radially to the disc. The difference of the two outputs is then used for signal detection.

In the optical disc format of the preferred embodiment of the invention as described above, a preformatted pit sequence is disposed in two parts offset precisely one-half track pitch radially to the disc on both sides of the track center. When the radial difference signal is generated from the output of a split photodetector, the light beam is tracking either a land center or a groove center except when passing through a header area, and the radial difference signal is therefore substantially 0.

When the light beam passes PID1 and PID2 in the groove track header area, for example, it appears from the perspective of the focused spot scanning the groove track that the light beam is offset to the right from the track center in the direction of beam spot travel, i.e., to the inside circumference side, because the preformatted pit sequence is offset to the outside circumference side of the disc, i.e., to the left in the direction of beam spot travel. If the radial difference signal at this time has positive polarity, the difference signal has the peak signal value. Note that the signal level varies between 0 and the peak level depending on whether pre-embossed pits are detected.

In difference signal detection the difference is obtained from inverse phase signals output by two sensors, and signal amplitude is thus doubled. This results in a better S/N ratio than does sum signal detection.

The push-pull single-beam optical system used for tracking control in the driving apparatus of a rewritable optical disc uses a difference signal detector radially to the disc. Difference signal detection of the header information can be achieved by providing the detector system with the ability to pass data bandwidth frequencies. It is therefore possible to improve reproduction signal quality with substantially no additional components required.

The required signal amplitude can also be obtained by forming the pits to the same $\lambda/6$ depth as the grooves. This has the added advantage of making master disc production easier because the pre-embossed pits and grooves can be formed to the same depth.

Considering these advantages, the header area containing the address signal and other information is preformatted from embossed pits to enable detection using a radial difference signal. Conditions are controlled for actual disc production so that detection jitter is minimized when the header area is read by means of a radial difference signal. Note that there is little margin for detection error and no benefit gained by applying sum signal detection to a disc thus optimized for difference signal detection.

Figure 7:
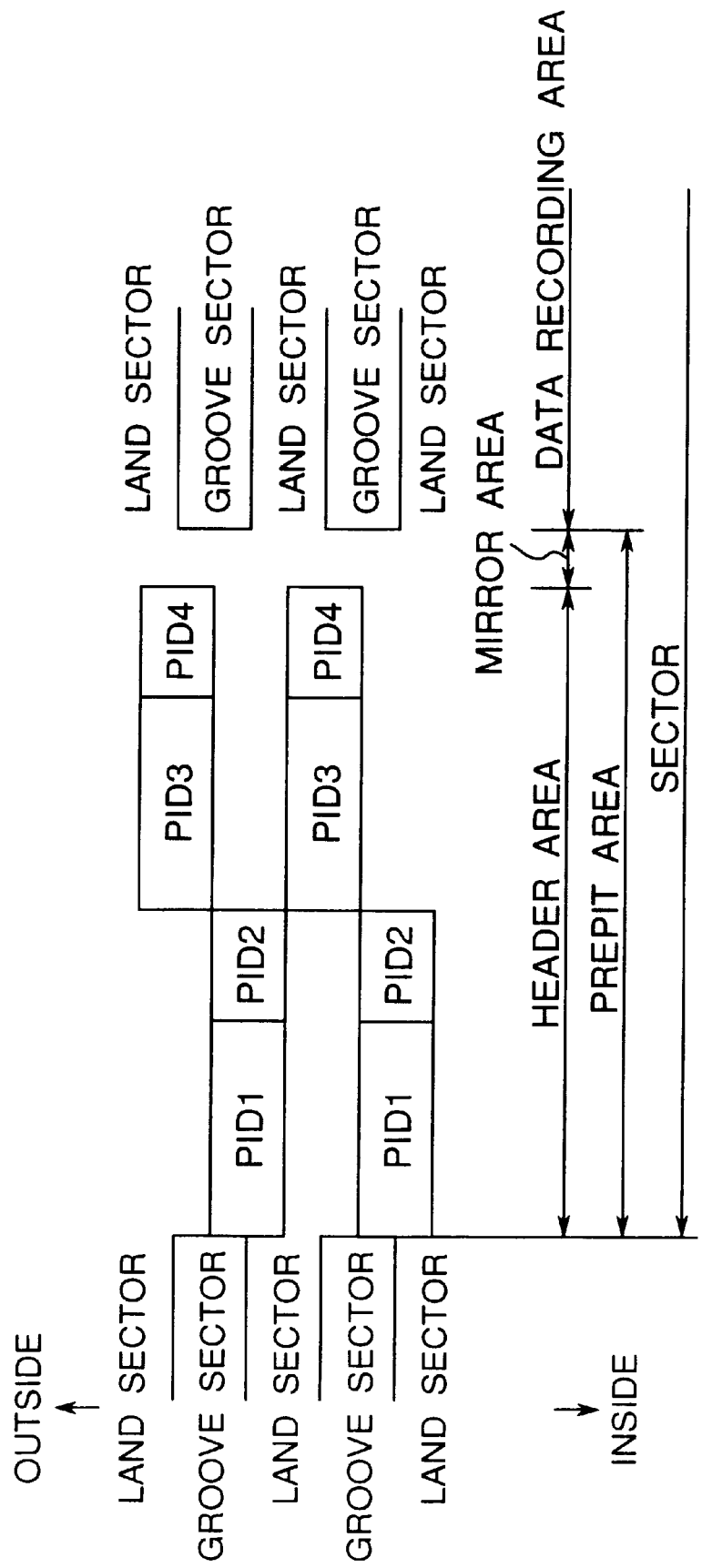
FIG. 7 is a map of an alternative header area layout in an optical disc according to the first embodiment of the invention.

It should be noted that alternative arrangements of the PID in the header area are also possible as shown in FIG. 7. This format is essentially the reverse of that shown in FIG. 5 and described above. More specifically, PID1 and PID2 in this format are offset ½ groove width toward the inside circumference from the groove center in the header area immediately preceding a data recording area in a groove track, and PID3 and PID4 are offset ½ groove width toward the outside circumference from the groove center in the same header area. This means that PID1 and PID2 in the header area immediately before the data recording area of a land track are PID1 and PID2 from the groove track header area on the outside circumference side of that land track, and PID3 and PID4 are PID3 and PID4 from the header area of the groove track on the inside circumference side of that land track. This is because these are the PID offset ½ groove width from the center of the respective adjacent groove tracks towards that land track.

Figure 8:
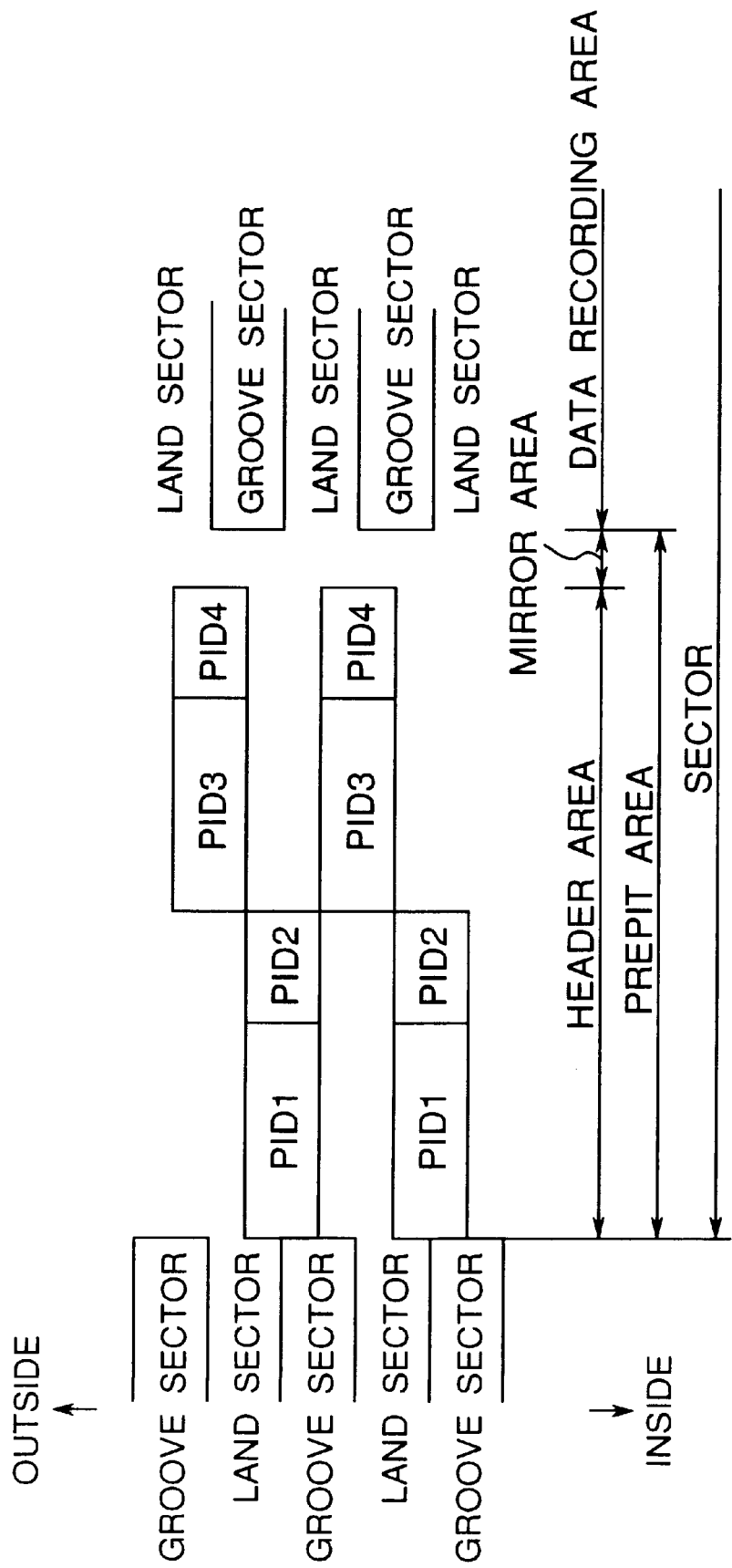
FIG. 8 is a map of an alternative header area layout in the transition area between land tracks and groove tracks in an optical disc according to the first embodiment of the invention.

As a result, as shown in FIG. 8, the header format in the transition zone between the land tracks and groove tracks, which is again aligned at a single radial position from inside circumference to outside circumference of the disc, is similarly the reverse of the header format shown in FIG. 6. More specifically, the format of the header area in this transition area is the same as the header format in non-transition areas. Specifically, PID1 and PID2 are offset ½ groove width toward the inside circumference from the groove center in the header area immediately preceding a data recording area in a groove track, and PID3 and PID4 are offset ½ groove width toward the outside circumference from the groove center in the same header area.

This again means that PID1 and PID2 in the header area immediately before the data recording area of a land track are PID1 and PID2 from the groove track header area on the outside circumference side of that land track, and PID3 and PID4 are PID3 and PID4 from the header area of the groove track on the inside circumference side of that land track. This is because these are the PID offset ½ groove width from the center of the respective adjacent groove tracks towards that land track.

It should be noted that while the header format shown in FIG. 7 and FIG. 8 results in a physical land and groove sector configuration that is different from that shown in FIG. 5 and FIG. 6, there is no change in the tracking offset correction capability of this format.

Embodiment 2

The second embodiment of the invention relates to an optical disc driving apparatus for driving an optical disc described in the first embodiment above. The optical disc driving apparatus of this second embodiment is described next below with reference to FIG. 9, a block diagram thereof.

Figure 9:
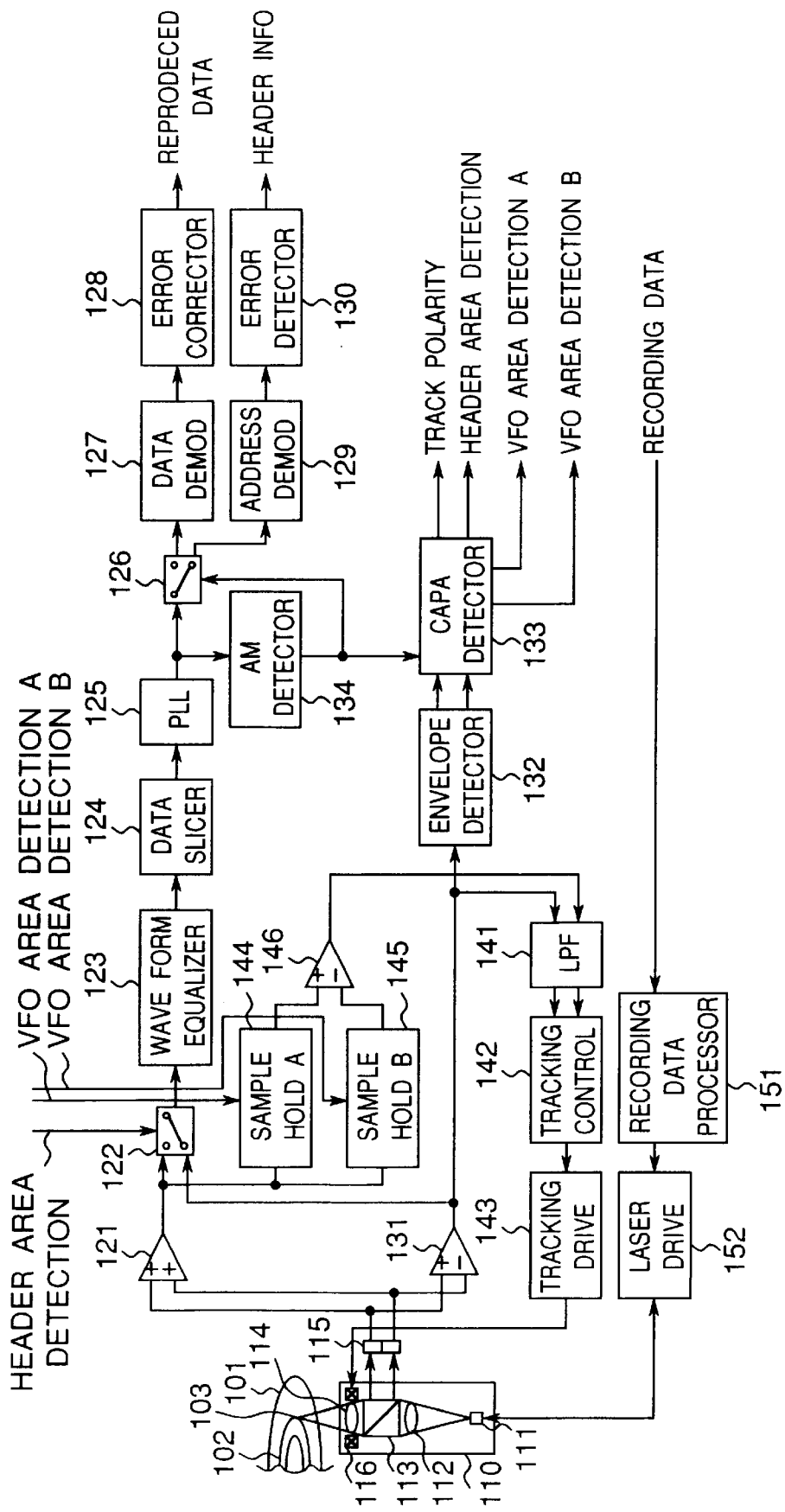
FIG. 9 is a block diagram of an optical disc driving apparatus according to the second embodiment of the invention.

Referring to FIG. 9, an optical disc 101 using a single spiral land-groove recording format comprises recording track 102 on which the light spot 103 of a laser beam emitted to the optical disc is focused. The rotational velocity of this optical disc 101 is driven by a spindle motor and spindle motor control circuit not shown in the figure so achieve and maintain the recording track at a particular effective linear velocity. Optical disc recording and reproducing are accomplished by an optical head 110, which comprises a laser 111, collimator lens 112, beam splitter 113, objective lens 114, split photodetector 115, and lens actuator 116.

The laser 111 is controlled by laser driver 152 at a particular reproduction power level during optical disc reproduction. During recording the laser 111 is controlled by a signal from the recording data processor 151 to output a laser pulse at a particular pulse power level determined by the write data. The laser beam of wavelength λ emitted by the laser 111 is collimated by the collimator lens 112, passed through the beam splitter 113 to an objective lens 114 of aperture NA, and is thus focused on the optical disc recording surface to a focused spot 103 of a particular size. To ensure that the beam spot 103 is focused on the optical disc recording surface, the vertical focal position is controlled, to the optical disc recording surface by a focusing servo controller not shown in the figure. So that the beam spot is also focused on a recording track, the radial focal position is controlled by the tracking control system.

The tracking control system comprises a difference signal detector 131, low-pass filter (LPF) 141, tracking control circuit 142, tracking drive circuit 143, sample hold circuit A 144, sample hold circuit B 145, tracking offset detector 146, and lens actuator 116.

The tracking control system applies a push-pull tracking control method to track the light spot to the recording track. More specifically, the difference signal detector 131 detects a radial difference signal based on the output from the split photodetector 115. The difference signal is then passed through the LPF 141 to extract the servo frequency signal and generate the tracking error signal used for push-pull tracking control.

The output of a sum signal detector 121 for detecting the total reflection from the optical disc is sampled and held in the header area, in which pre-embossed pit sequences are offset to the right and left sides of the track center as described in the first embodiment above, and tracking offset is detected from the sample difference. To accomplish this sample hold circuit A 144 and sample hold circuit B 145 sample the sum signal at a timing indicated by the area discrimination signal. The sample difference is obtained by a tracking offset detector 146 to detect the tracking offset signal. This tracking offset signal is also passed through the LPF 141 to the tracking control circuit 142.

The tracking control signal generated by the tracking control circuit 142 is input to the tracking drive circuit 143 for driving the lens actuator 116. The output current of the tracking drive circuit 143 drives the lens actuator 116 and objective lens 114 radially across the optical disc.

To thus control tracking, the outputs of the split photodetector 115 are separately connected. One output is connected to the difference signal detector 131 for detecting a difference signal radially to the optical disc for tracking servo control as described above. The other output is connected to the sum signal detector 121 for detecting the sum signal of light reflected from the disc to detect the tracking offset and to detect data recorded to a phase-change film can be read using the change in reflectivity in the recording tracks of the optical disc. Note that the difference signal is also used for reading the header area information.

The output signals of the sum signal detector 121 and difference signal detector 131 are supplied to the reproduction signal selector 122. The reproduction signal selector 122 is controlled by an area discrimination signal to select as the reproduction signal selector output the input from the sum signal detector 121 or difference signal detector 131.

To reduce detection error, the reproduction signal is passed through a waveform equalizer 123 to correct the data band frequency spectrum which is then digitized by a data slicer 124. A PLL 125 then extracts the reproduction clock from the digital signal, adjusts bit synchronization and detects the channel bits. The reproduced channel bits are input to the demodulation circuit selector 126. If the channel bits are reproduced from a data recording area, the demodulation circuit selector 126 outputs to the data demodulator 127. If the channel bits are from a header area, the demodulation circuit selector 126 outputs to the address demodulator 129.

When phase-change recorded data is read from the sum signal, the signal is demodulated by the data demodulator 127 and errors detected by the error correction circuit 128 are corrected to output the reproduction data. Similarly, when the pre-embossed header information is read from the difference signal, the signal is demodulated by the address demodulator 129 and address errors are detected by the error detector 130. If no errors are found and the address is correct, the header information is reproduced.

To which demodulator the demodulation circuit selector 126 outputs is controlled by the AM detector 134. The AM detector 134 monitors the channel bit stream output from the PLL 125. When an address mark AM is detected, the Al detector 134 switches the demodulation circuit selector 126 to output the channel bit stream to the address demodulator 129 at the sector format timing to reproduce the Pid appearing directly after the address mark AM.

In addition to being used for tracking control and header information detection as described above, the output from the difference signal detector 131 is also used for detecting the transition point between land tracks and groove tracks. To accomplish this the difference signal is input to the envelope detector 132 to detect the envelope on the positive and negative polarity sides of the difference signal waveform and generate the positive polarity envelope signal and negative polarity envelope signal. Both envelope signals are input to the Complimentary Allocated Pit Address (CAPA) detector 133. The CAPA is the area in the header area in which the sector address information is stored using pre-embossed pit sequences offset equal amounts on both sides of the track center as described in the first embodiment above.

The CAPA detector 133 determines from the header area envelope whether that header area is from a land track sector or groove track sector, and outputs a corresponding track polarity signal. The CAPA detector 133 uses the AM detection signal output from the AM detector 134 each time an address mark AM appears as the timing signal for making this determination. The track polarity signal information is supplied to the tracking control circuit 142, and is used for switching between land tracking and groove tracking.

It should be noted that the difference signal reproduced by the difference signal detector 131 is demodulated by the address demodulator 129, and the sum signal reproduced by the sum signal detector 121 is demodulated by the data demodulator 127. It is therefore not necessary to provide two selectors, specifically the reproduction signal selector 122 and the demodulation circuit selector 126, if a discrete waveform equalizer 123, data slicer 124, and PLL 125 line is provided for the difference signal and the sum signal. It should also be noted, however, that the above configuration is used in the preferred embodiment of the invention as a means of reducing the circuit scale by sharing common circuit components that are never used simultaneously.

The operation of an optical disc driving apparatus during reproduction of an optical disc having the sector format shown in FIG. 2 and FIG. 3 according to the first embodiment of the invention is described next below with reference to the time base.

It is assumed that at the start of the operation described below correct tracking has been established at a given disc position that is not a transition point between land tracks and groove tracks in a single spiral land-groove format optical disc. It is further assumed in this example that a groove track is being tracked at this position. Both the sum signal and difference signal are reproduced as the focused spot 103 scans the recording track 102.

If the linear velocity of the recording track is set to, for example, 6.0 m/sec at this time, and data is recorded to a phase-change media using a 650 nm wavelength $\lambda$ laser beam focused by a lens with an aperture of NA=0.6, the minimum size of recording marks that can be reproduced with a byte error rate of $10^{-4}$ or less without error correction has been experimentally demonstrated to be 0.6 $\mu$m or greater. When a modulation method such as (8,16) modulation yielding a shortest mark length of 3T at ½ the code rate is used for mark edge recording, a recording mark length of 0.6 $\mu$m is equivalent to a channel bit length of (0.6/3) $\mu$m=0.2 $\mu$m and a data bit length of (0.6/3)*2 $\mu$m=0.4 $\mu$m.

When an optical disc using a sector format with a 2048-byte data recording capacity in a 2697-byte recording sector according to the present invention is reproduced, the linear velocity must be approximately 5.8 m/sec to achieve the 11.08 Mbit/sec data rate required for video reproduction because 11.08 Mbit/sec * 0.4 $\mu$m/bit * 2697/2048= approximately 5.8 m/sec.

The channel bit frequency is 11.08 Mbit/sec * 2 * 2697/2048=29.18 MHz. At this frequency it takes (2697 * 8 * 2)/29.18 MHz=1.48 msec to reproduce one sector, and (128 * 8 * 2)/29.18 MHz=70 $\mu$sec to reproduce one header area.

The linear velocity of the disc, or more specifically the rotational velocity of the disc, can be maintained at substantially the desired target speed by detecting the period of the header area, which appears every 1.48 msec, and applying feedback control. It is possible to roughly control the disc speed to enable header area and data recording area detection, then discriminate the current track address and zone to correct and control the disc speed to the precise rated velocity.

The present disc format uses a Zoned Constant Linear Velocity (ZCLV) formatting and control method. ZCLV divides the recording tracks into 24 zones from the inside circumference to the outside circumference of the disc, and changes the rotational velocity of the disc in each zone to maintain a substantially constant linear velocity in each zone. The disc velocity therefore ranges from a minimum 16.9 Hz at the outside circumference to a maximum 39.8 Hz at the inside circumference, a difference of approximately 2.3 times.

Figure 10:
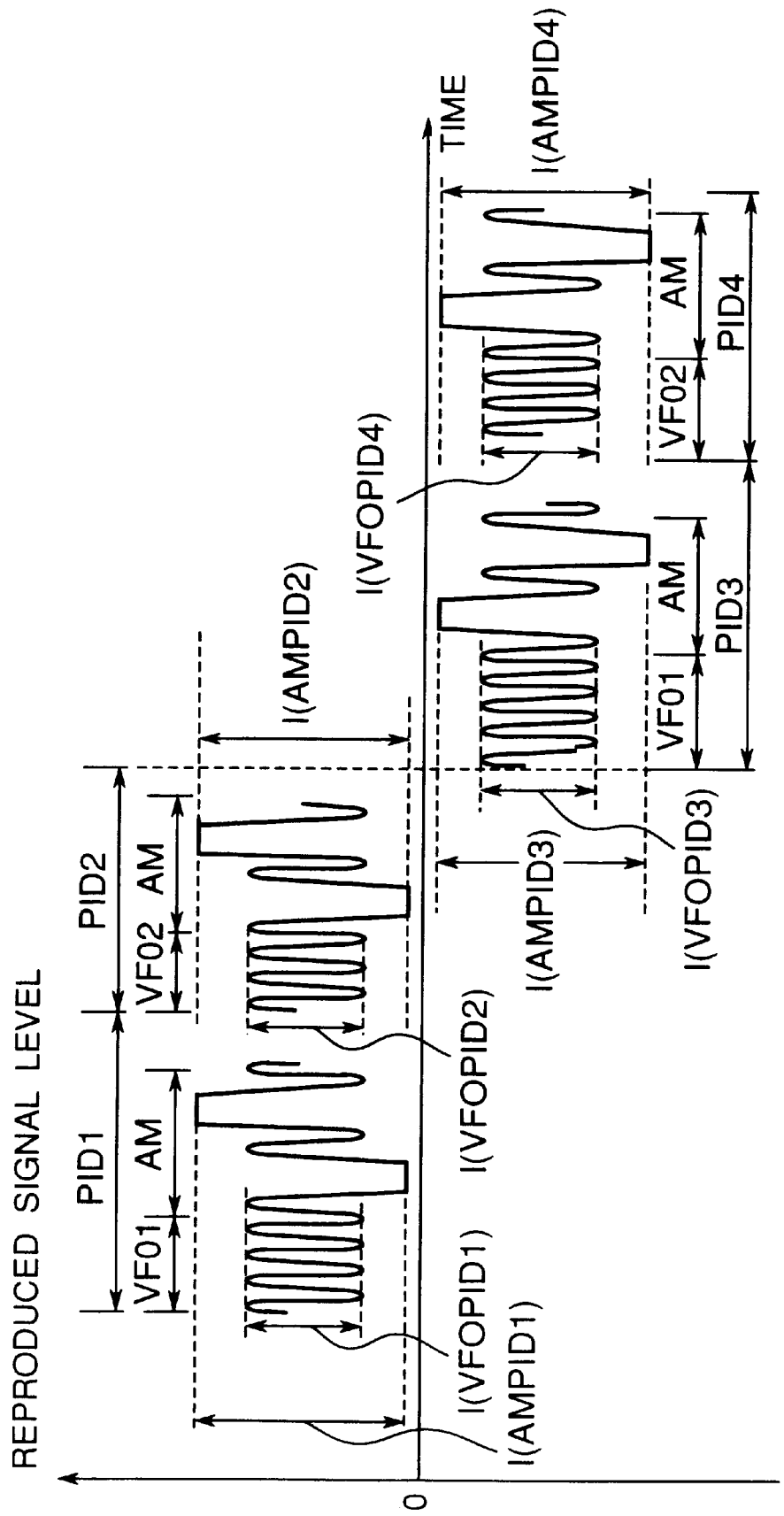
FIG. 10 is a waveform diagram of the difference signal reproduction wave in a groove track header area of an optical disc according to the first embodiment of the invention when reproduced by an optical disc driving apparatus according to the second embodiment of the invention.
Figure 11:
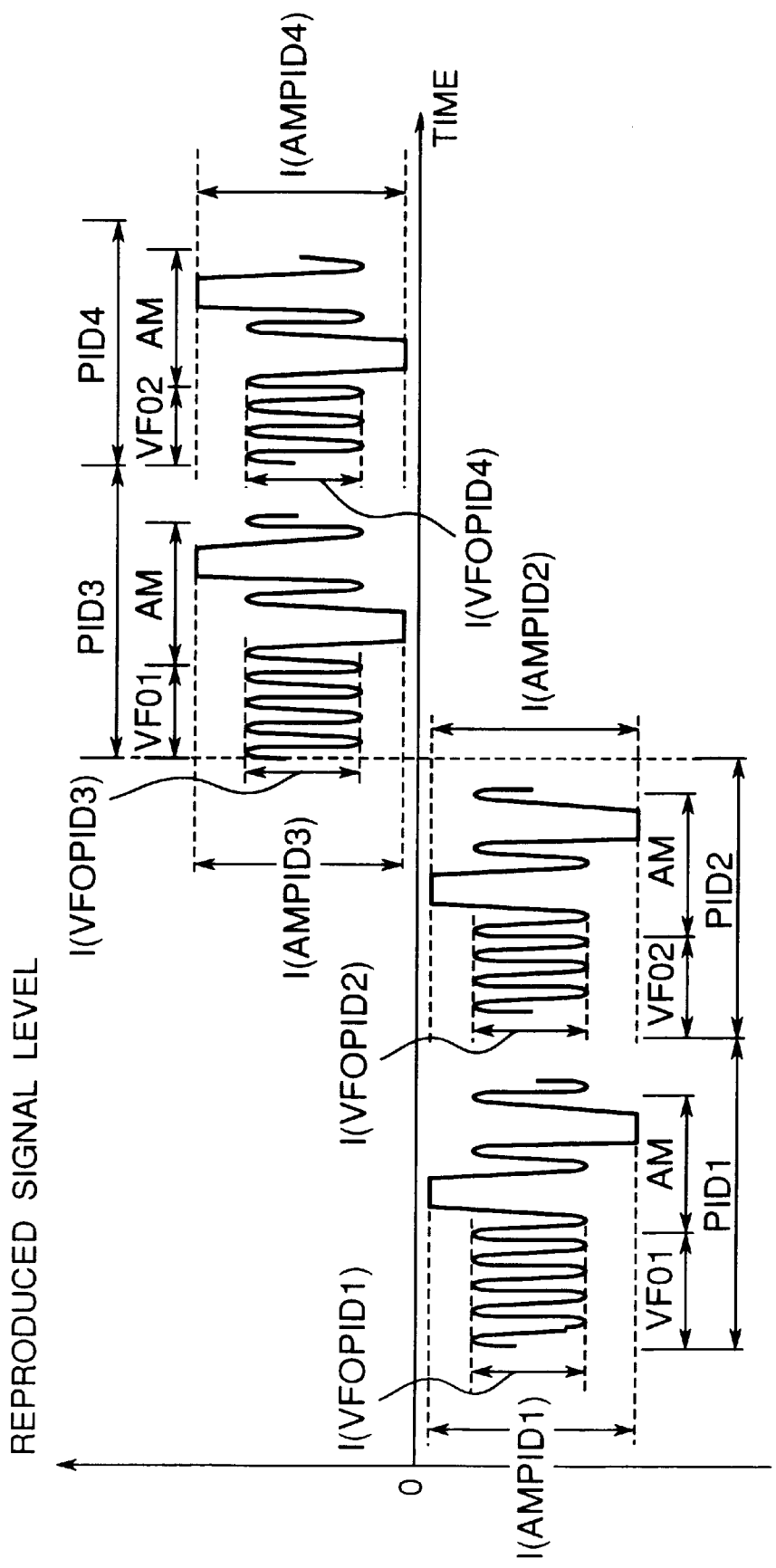
FIG. 11 is a waveform diagram of the difference signal reproduction wave in a land track header area of an optical disc according to the first embodiment of the invention when reproduced by an optical disc driving apparatus according to the second embodiment of the invention.
Figure 12:
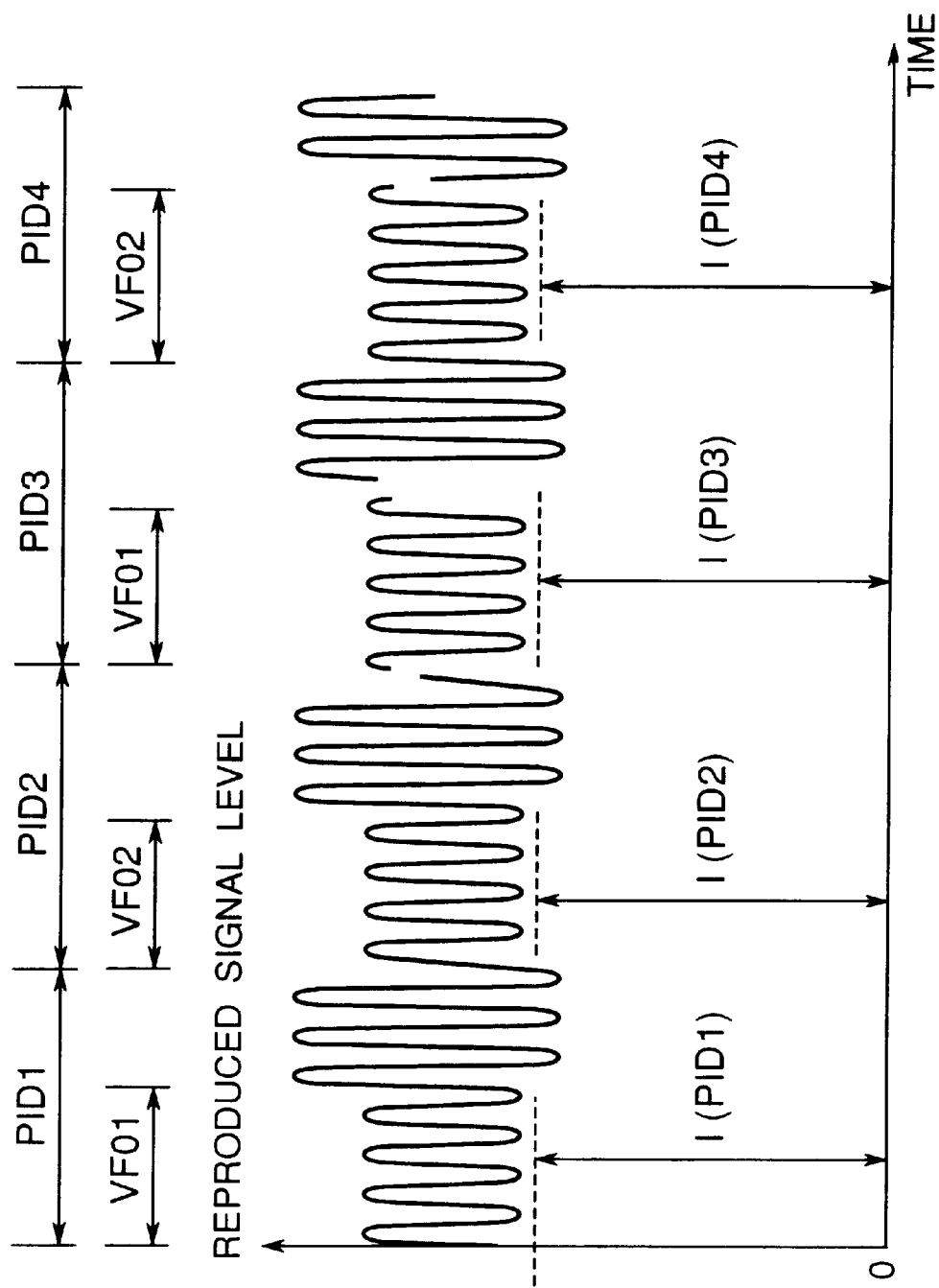
FIG. 12 is a waveform diagram of the sum signal reproduction wave in a header area of an optical disc according to the first embodiment of the invention when reproduced by an optical disc driving apparatus according to the second embodiment of the invention.
Figure 13:
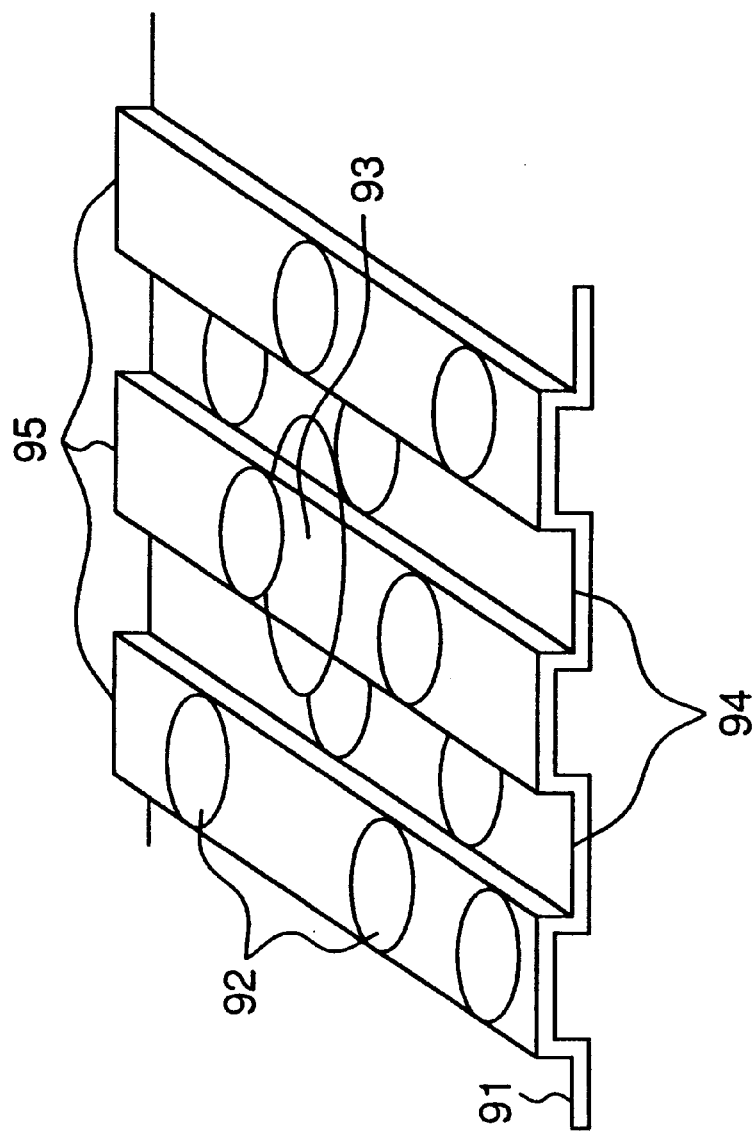
FIG. 13 is used to describe the structure of an optical disc using a land and groove recording format according to the related technology.
Figure 14:
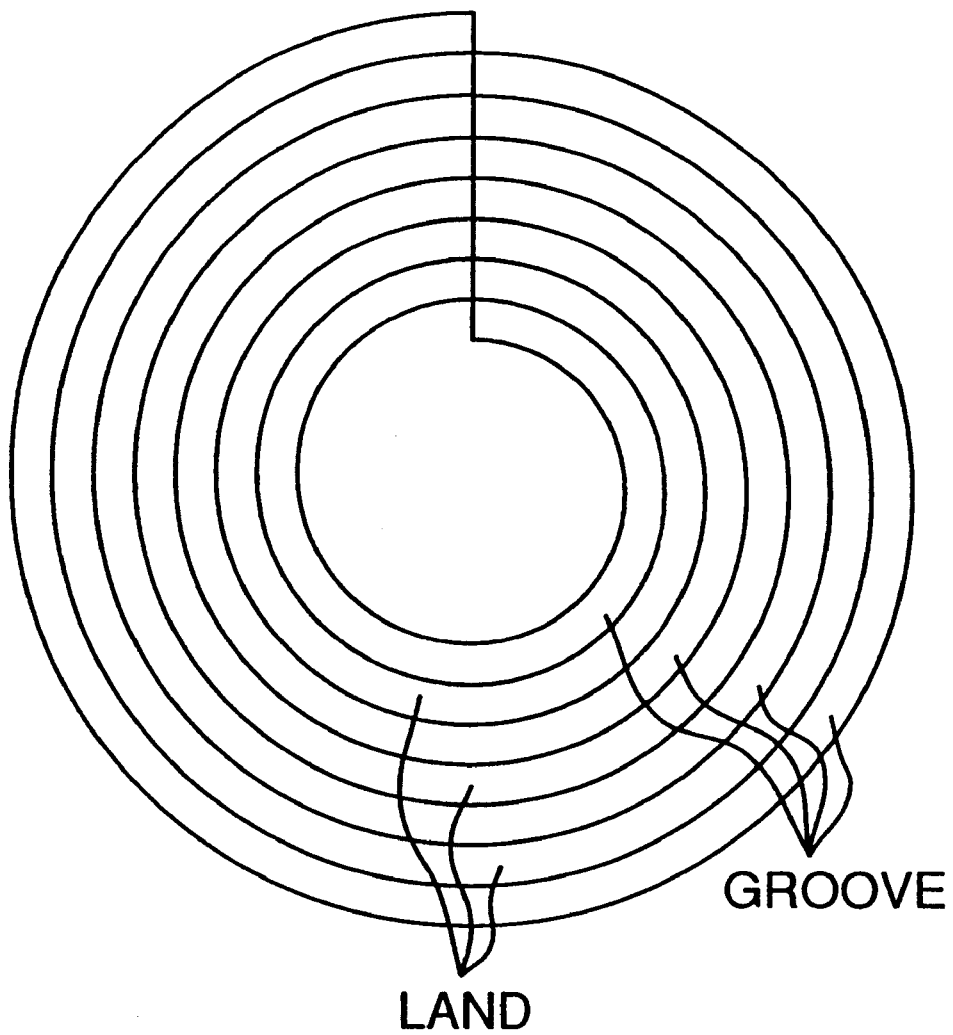
FIG. 14 is used to describe the single spiral land-groove recording format of an optical disc according to the related technology.
Figure 15A:
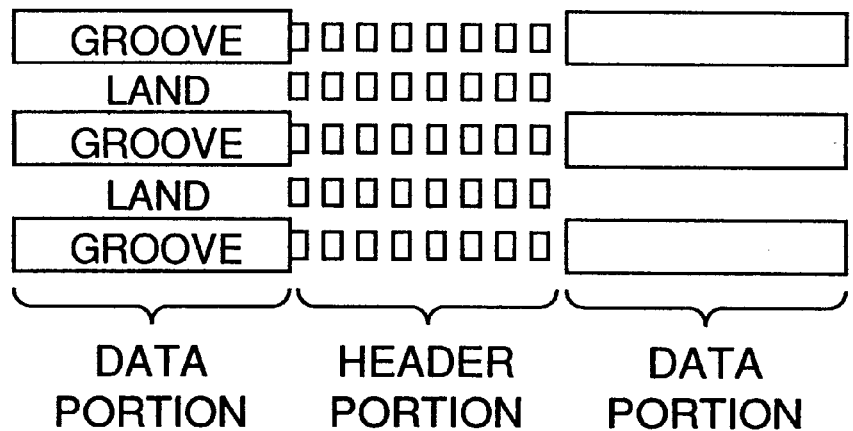
FIGS. 15A, 15B, and 15C are used to describe various header area formats in land and groove recording according to the related technology.
Figure 15B:
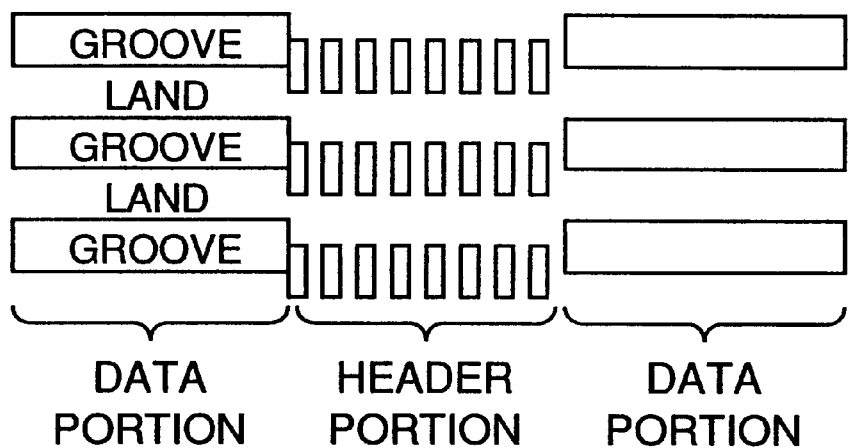
Figure 15C:
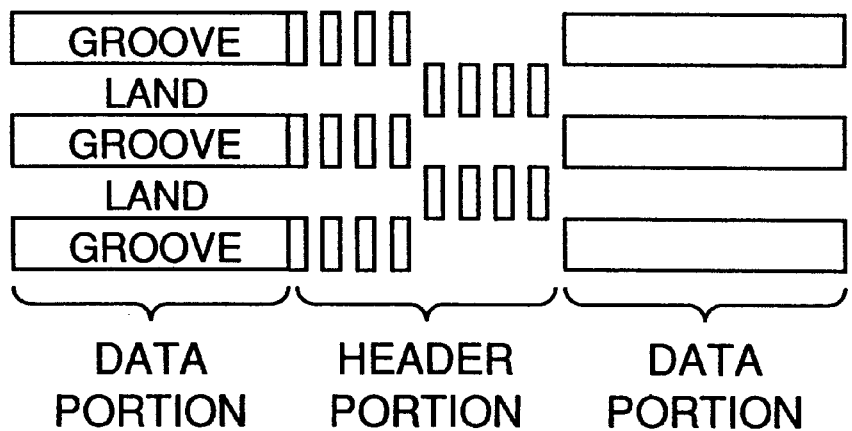
Figure 16:
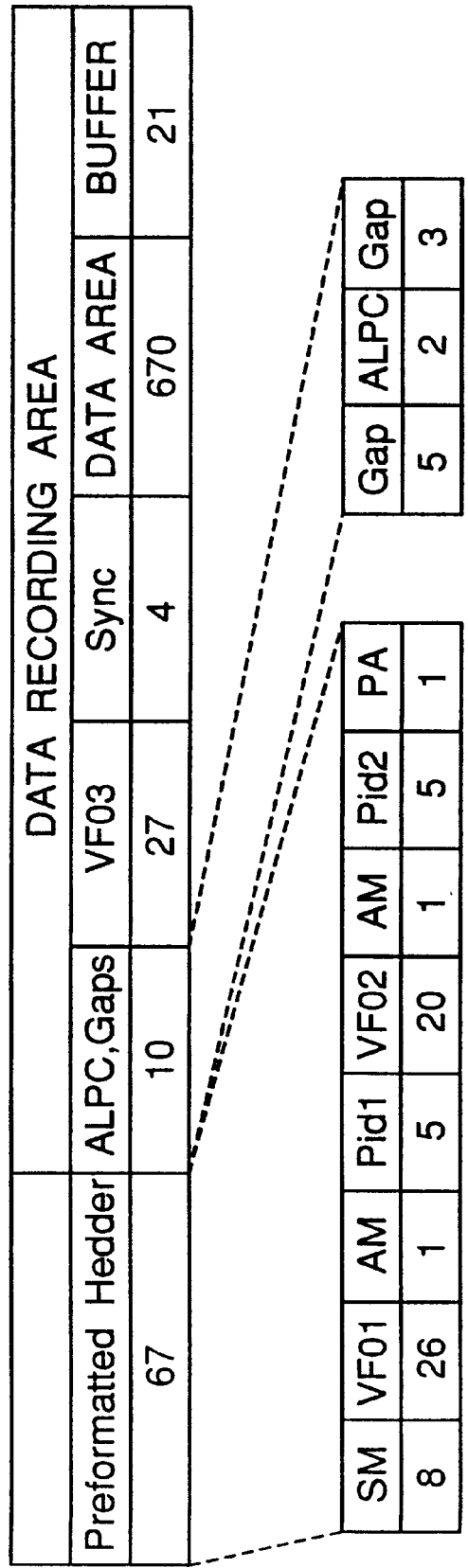
FIG. 16 is used to describe the sector format of an ISO-standard 130 mm magneto-optical disc according to the related technology.

The difference signal waveform when the light spot is on track is shown in FIGS. 10 and 11, and the sum signal waveform is shown in FIG. 12.

It should be noted that the pre-embossed PID1 and PID2 header area address signals in the groove tracks of the present optical disc are offset from the track center toward the outside circumference of the disc. The position of the split photodetector 115 and the signal polarity of the difference signal detector 131 are therefore adjusted so that the difference signal appears on the positive polarity side in the header area. With this format the PID3 and PID4 are offset toward the inside circumference, and the difference signal therefore appears on the negative polarity side. This is shown in FIG. 10.

Signal polarity is accordingly different in the land track sectors. As described in the first embodiment, the pre-embossed pits of the address signal at PID1 and PID2 of the land track header area are offset from the track center toward the inside circumference, and PID3 and PID4 are offset toward the outside circumference. Difference signal polarity is therefore negative at PID1 and PID2, and positive at PID3 and PID4. This is shown in FIG. 11.

In FIG. 10 and FIG. 11 the VFO signal amplitude in PID1 is shown as VFOPID1, VFO signal amplitude in PID2 is shown as VFOPID2, and so forth. The address mark AM signal amplitude in PID1 is likewise shown as AMPID1, the address mark AM signal amplitude in PID2 is likewise shown as AMPID2, and so forth.

The signal amplitude of the Pid, IED, and PA in each PID are not shown in the figures and vary according to the data content, but does not exceed the address mark AM signal amplitude. This is because the address mark AM consists of a space and mark of a 14T mark length, which is longer than the longest mark length (11T) appearing in the recorded data.

Note further that the amplitude of PID1, PID2, PID3, and PID4 vary according to how far off track the light spot is tracking.

While the pre-embossed pits of the address signal are offset from the track center, the pits diffract the light spot because of the relationship between the light spot: diameter (approximately 1.0 μm) and the pit width (approximately 0.74 μm). The total reflection from the disc is therefore modulated by the pits, and the sum signal varies as shown in FIG. 12. The peak VFO signal level in each PID is shown in FIG. 12 as I(PID1), I(PID)2, I(PID3), and I(PID)4. The signal level shown in FIG. 12 drops as modulation by the pits increases because the signal level drops at some parts of the pre-embossed pits. The VFO level in PID1 and PID2 and the VFO level in PID3 and PID4 varies according to how far off track the light spot is tracking.

The header area reproduction signals output from the difference signal detector 131 as shown in FIG. 10 and FIG. 11, and the data recording area reproduction signal output from the sum signal detector 121 as shown in FIG. 12 are then level sliced by the PLL 125 and digitized. The slice levels are determined by monitoring the reproduction signal. The level is set at PID1 and PID2 to the middle of the amplitude level in VFO1 of PID1. VFO1 is used for reproduction clock synchronization, and it is therefore necessary to adjust the slice level at the beginning of VFO1. Slice level setting can be quickly accomplished if the reproduction signal selector 122 is set to pass the difference signal when data is not being reproduced so that the header area is always reproduced.

The slice level is quickly set using the first: plural bytes at the beginning of VFO1 so that a digital signal with the edge adjusted to the correct timing is supplied to the PLL 125. If, for example, the slice level is to be set in approximately 5 μsec when VFO1 appears, 9 bytes is required. Thereafter the level is held or the slice level tracking response rate to the reproduction signal is dropped greatly to hold the slice level in the middle of the data amplitude. The VFO and AM signal duty ratio is approximately 50%, and the Pid and IED are modulated with (8,16) modulation to cancel the dc component and then recorded with the mark edges. The duty ratio is thus maintained at approximately 50% throughout the PID. Noticeable level deviation will therefore not occur even if the slice level tracking rate is dropped. Once the slice level is thus appropriately adjusted, the digital signals output thereafter are valid.

After the edge timing is confirmed, the digital VFO1 signal generated from PID1 is used to generate the reproduction clock signal. As described in the first embodiment above, the number of edges required for clock synchronization is defined according to the single frequency pattern of 4T marks and 4T spaces in VFO1.

It is also necessary to expect the clock information obtained from the reproduction signal to change because of the wide range of disc speeds used, and when the PLL range expands more time is required for frequency locking. Because VFO1 in the sector format of the invention is 36 bytes, approximately 24 bytes, for example, are available for generating the reproduction clock after plural bytes at the beginning of VFO1 are used for slice level setting.

VFO2 in PID2 is 8 bytes long as also described above. VFO2 is shorter than VFO1 because it is not necessary to adjust the slice level at VFO2, and VFO2 therefore only needs to be long enough for resynchronization in the event slight clock error or phase shifting has occurred due to a media defect after locking synchronization in PID1. It should be noted that while VFO2 is longer than 8 bytes in conventional formatting methods to assure the same detection reliability as in PID1, the length of VFO2 in the present invention has been determined as a trade-off made due to the limitations of the sector byte count. With respect to circuit operation, the slice level is therefore not set at VFO2.

Using the reproduction clock generated by PLL 125, the PLL 125 synchronizes and converts the digital signal output of the data slicer 124 to the channel bit stream output from the PLL 125.

To read the header area data, the address mark AM, which is a unique channel bit pattern, is detected using a bit pattern matching method to discriminate the bit unit timing and determine the byte limits. The 3-byte address mark AM contains one 14T mark and one 14T space. Note that this pattern is not found in any other part of the sector, including the data recording area.

In the optical disc sector format according to the first embodiment above, the address mark AM is followed by a Pid, IED, and PA, a total of 7 bytes. The header information is reproduced by isolating and inputting these 7 bytes to the address demodulator 129 at the input timing controlled by the AM detector 134. Byte synchronization is reasserted in each PID because there is one address mark AM in each PID of the header area, and the header information is therefore reproduced at each Pid for a total four times in each header area.

While the reproduction circuit operates as described above to reproduce the header area, it is first necessary to detect the header area in order to start the above operation. This is accomplished by using the difference signal, which appears during tracking control only in the header area. The sum signal, however, also appears in the header area as a waveform such as shown in FIG. 12, and in the data recording area to which user data is written. The difference signal, however, does not appear in the data recording area even when phase-change recording marks are used for data writing insofar as the marks are properly recorded at the track center. It is therefore possible to detect the header area by monitoring whether the absolute value of the difference signal envelope exceeds a particular value.

The envelope detector detects the difference signal waveform envelopes on both the positive and negative sides. These positive polarity and negative polarity envelope signals are input to the CAPA detector 133.

Referring to FIG. 10, the positive polarity envelope signal is produced by detecting the envelope on the positive polarity side of the difference signal waveform. This positive envelope signal follows the maximum amplitude on the positive polarity side of the difference signal reproduced from PID1 and PID2, and drops substantially to zero in PID3 and PID4.

The negative polarity envelope signal is likewise produced by detecting the envelope on the negative polarity side of the difference signal waveform. This negative envelope signal drops substantially to zero in PID1 and PID2, and follows the maximum amplitude on the negative polarity side of the difference signal reproduced from PID3 and PID4.

The CAPA detector 133. therefore compares the positive envelope signal with a particular positive threshold value at the address mark AM detection timing in PID1, PID2, PID3 and PID4, and normally detects a H, H, L, L comparison result. The CAPA detector 133 also compares the negative envelope signal with a particular negative threshold value at the same detecting timing, and normally detects a L, L, H, H comparison result. Note that in both cases H indicates that the absolute value of the envelope signal is greater than or equal to the absolute value of the threshold value, and L indicates that the absolute value of the envelope signal is less than or equal to the absolute value of the threshold value.

Referring to FIG. 11, the positive polarity envelope signal in the header area of a land track sector drops substantially to zero in PID1 and PID2, and follows the maximum amplitude on the positive polarity side of the difference signal reproduced from PID3 and PID4. The negative polarity envelope signal likewise follows the maximum amplitude on the negative polarity side of the difference signal reproduced from PID1 and PID2, and drops substantially to zero in PID3 and PID4.

When the CAPA detector 133 then compares the positive and negative envelope signals at the address mark AM detection timing in PID1, PID2, PID3 and PID4, it normally detects L, L, H, H and H, H, L, L comparison results, respectively.

Because the results of comparing the two envelope signals thus differ in the header areas of groove track sectors and land track sectors, it is possible to detect groove track polarity and land track polarity from the envelope signals. The result is output as a track polarity signal. The tracking control system uses this track polarity signal to appropriately control land and groove tracking.

It is also possible to detect header areas by comparing the difference signal waveforms in the same manner as described above when the four PID are detected. The result of this comparison is output from the CAPA detector 133 as a header area discrimination signal. The timing at which the data recording area of the sector starts is also known from this header area detection result, and this makes it possible to switch the reproduction signal selector 122 to pass the sum signal during the period determined to be the data recording area so that data can be reproduced.

It should be noted that the response rate of the envelope detector is restricted to avoid operating errors caused by media defects and enable header area detection using plural bytes at the beginning of the VFO1 area of the header area. Note that as described above 9 bytes are required if the header area is to be detected using a difference signal that persists for 5 $\mu$sec.

That tracking offset is detected from the sum signal of disc reflection using the offset positions of the pre-embossed pits in the PIDs has been previously described above. As shown in FIG. 12, the maximum amplitude of the sum signal is limited by the VFO in the four PID. When the optical system of the optical head is operating in a balanced state with the light spot tracking the track center, the VFO level of PID1 and PID2 and the VFO level of PID3 and PID4 are the same. When tracking is offset from the track center, a difference occurs between the VFO level of PID1 and PID2 and the VFO level of PID3 and PID4 based on how far off track the light spot is tracking.

To determine this difference, the CAPA detector 133 outputs VFO discrimination signal A identifying the VFO areas in PID1 and PID2, and VFO discrimination signal B identifying the VFO areas in PID3 and PID4. These two signals are used to control the sample hold circuit A 144 to sample and hold the sum signal level at the VFO timing of PID1 and PID2, and to control the sample hold circuit B 145 to sample and hold the sum signal level at the VFO timing of PID3 and PID4.

A composite track wobbling method based on the method as described in Japan Examined Patent Publication (kokoku) H7-46430 (1995-46430) is used for tracking offset correction, in which sampling point of reproduction signal amplitude is a VFO composed of a fixed single frequency pattern. This is necessary because dedicated wobble pits specifically for tracking offset detection cannot be provided because of sector length limitations, and it is therefore preferable to use a stable amplitude area that is as long as possible. This low frequency tracking offset correction is made possible by applying feedback control to equalize reproduction levels I(PID1), I(PID2), I(PID)3, and I(PID4) from the pre-embossed VFO pits of the wobbling PID areas of the header area while continuously adjusting the tracking servo to accurately track land and groove tracks with push-pull control.

The optical disc according to the first embodiment of the invention has an extremely high recording density in both radial and track directions. It is therefore necessary to eliminate as many potential sources of detection error as possible if signal detection and data reproduction with a low detection error rate and high reliability are to be achieved. When push-pull tracking servo control using a single-beam optical system is used, offset correction becomes a significant problem as described above.

As also described above tracking offset correction using a sum signal and track polarity detection using a difference signal are simultaneously accomplished during PID reproduction. By using the PID format described in the first embodiment of the invention above, these two functions have been integrated into the physical format of the optical disc. The optical disc driving apparatus of the invention described above simultaneously achieves both a tracking offset correction function using a sum signal and a track polarity detection function using a difference signal during PID reproduction by applying two signal processing circuits.

The optical disc and optical disc driving apparatus of the present invention achieve. the following effects by means of the configurations described in the above embodiments.

An optical disc with a single spiral land-groove format suited to rewritable optical disc media can be achieved with an optical disc comprising according to the present invention a pre-embossed pit area comprising a mirror area and four physical address areas PID each having a single frequency pattern area VFO, address mark AM, address area Pid, address error detection area IED, and postamble PA.

By splitting the pre-embossed pit area into two segments and disposing those two segments offset to the inside and outside circumference sides of the groove track center in a wobble pattern, it is further possible for an optical disc driving apparatus for reproducing the optical disc of the invention to correct tracking offset and accurately detect the transition point between land tracks and groove tracks by means of the address signal at the beginning of each sector.

It is further possible easily assure format compatibility with read-only optical discs used, for example, in digital video applications.

It is also possible to achieve a physical format whereby data rewrite reliability and address information read reliability can be improved.

It is further possible with the optical disc driving apparatus according to the present invention to accurately correct tracking offset and to accurately detect the transition point between land tracks and groove tracks.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical disc having a data recording area comprising:

a disc substrate with grooves formed circumferentially and lands between said grooves, a phase-change recording film is formed in the data recording area for recording information using the leading and trailing edges of recording marks produced by a localized change in reflectivity effected in the phase-change recording film by emitting thereto a laser beam of a particular wavelength $\lambda$ focused by a lens of a particular aperture NA, and a single recording spiral is formed by alternately connecting groove recording tracks equivalent to one disc circumference and land recording tracks equivalent to one disc circumference with a track pitch p where $p<(\lambda/NA)<2p$, said recording tracks comprise an integer number of recording sectors where the length of a recording sector is sufficient to store the data written to a recording sector of a read-only optical disc and is an integer multiple of the synchronous frame length of a read-only optical disc, and each recording sector comprises a mirror area, and a header area preformatted with embossed pits that represent such information as address information, where at least the address information recorded to the header area is modulated by a runlength-limited modulation method, the header area comprises recorded four times a physical address area PID containing a single frequency pattern area VFO for synchronization clock generation and timing detection during reproduction, an address mark AM for byte synchronization during header reproduction and starting the detection timing, an address area Pid for holding the sector address information, an address error detection area IED for storing the address error detection code, and a postamble PA for completing modulation, where the four physical address areas PID are labelled PID1, PID2, PID3 and PID4 from the first PID in the header area with PID1 and PID2 offset approximately p/2 toward the outside circumference or inside circumference from the track center of a groove recording track, and PID3 and PID4 offset approximately p/2 toward the inside circumference or outside circumference from the track center of a groove recording track, the recording marks in said VFO are longer than the shortest recording mark of the modulation method, and VFO length in PID1 and PID3 is long enough to contain the edges of sufficient recording marks to lock reproduction clock synchronization within the VFO, VFO length in PID2 and PID4 is long enough to contain the edges of sufficient recording marks to reassert reproduction clock synchronization within the VFO, and the VFO areas in PID1 and PID3 are sufficiently longer than the VFO areas in PID2 and PID4, the address mark AM is longer than the longest recording mark of the modulation method and long enough to contain plural channel bit patterns of a recording mark length not appearing in the modulation bit sequence, the Pid is at least long enough to discriminate a number of recording sectors capable of storing user data exceeding the recording capacity of the above read-only optical disc medium, the IED is a length enabling address area Pid reproduction errors to be detected with an error detection rate less than or equal to a particular rate, the postamble PA is at least the length required by the modulation method and is a length enabling recording marks to be completed, and the mirror area is longer than the longest recording mark of the modulation method.

2. The optical disc according to claim 1 wherein the track pitch p is 0.74 $\mu$m when the laser beam wavelength $\lambda$ is 650 nm and the lens aperture NA is 0.6, the modulation method is a method for modulating at a rate of 8 data bits to 16 channel bits with the shortest recording mark being 3 channel bits and the longest recording mark being 11 channel bits, the VFO is 36 bytes in PID1 and PID3 and 8 bytes in PID2 and PID4, the address mark AM is 3 bytes, the Pid is 4 bytes, the IED is 2 bytes, the postamble PA is 1 byte, and the mirror area is 2 bytes.

3. An optical disc driving apparatus for driving an optical disc according to claim 1 comprising:

a disc motor for rotating the optical disc at a particular linear velocity, a laser diode for generating a laser beam of a particular wavelength $\lambda$, a focusing lens with a particular aperture NA, a photodetector for detecting reflected light from the optical disc, a first reproduction circuit for obtaining a sum signal of the total light incident on the photodetector, and a second reproduction circuit for obtaining a difference signal in the radial direction from the light incident on the photodetector, wherein the rotational velocity of the disc motor is controlled to drive the optical disc at a particular linear velocity, a laser beam of wavelength $\lambda$ is focused by a lens of aperture NA on the data recording area through the disc substrate, the emitted laser power is controlled to a particular reproduction power level during information reproduction, the focused laser beam is focused at a particular position on the phase-change recording film by means of focusing servo control perpendicularly to the recording surface and tracking servo control radially to the recording track, and the boundary between groove recording tracks and land recording tracks is detected based on the difference signal obtained from the second reproduction circuit, when the laser beam scans PID1, PID2, PID3, and PID4.

4. An optical disc driving apparatus for driving an optical disc according to claim 1 comprising:

a disc motor for rotating the optical disc at a particular linear velocity, a laser diode for generating a laser beam of a particular wavelength λ, a focusing lens with a particular aperture NA, a photodetector for detecting reflected light from the optical disc, a first reproduction circuit for obtaining a sum signal of the total light incident on the photodetector, and a second reproduction circuit for obtaining a difference signal in the radial direction from the light incident on the photodetector, wherein the rotational velocity of the disc motor is controlled to drive the optical disc at a particular linear velocity, a laser beam of wavelength λ is focused by a lens of aperture NA on the data recording area through the disc substrate, the emitted laser power is controlled to a particular reproduction power level during information reproduction, the focused laser beam is focused at a particular position on the phase-change recording film by means of focusing servo control perpendicularly to the recording surface and tracking servo control radially to the recording track, and tracking offset is corrected based on the sum signal obtained from the first reproduction circuit, when the laser beam scans PID1, PID2, PID3, and PID4.

5. An optical disc driving apparatus for driving an optical disc according to claim 1, wherein the embossed pits are detectable from a radial difference signal.

* * * * *